(12) United States Patent
Manoni

(10) Patent No.: US 7,328,369 B2
(45) Date of Patent: Feb. 5, 2008

(54) INHERENTLY FAIL SAFE PROCESSING OR CONTROL APPARATUS

(75) Inventor: Vittorio Manoni, Budrio (IT)

(73) Assignee: Alstom Ferroviaria S.p.A., Savigliano (IT)

( * ) Notice: Subject to any disclaimer, the term of this patent is extended or adjusted under 35 U.S.C. 154(b) by 518 days.

(21) Appl. No.: 10/513,353

(22) PCT Filed: Apr. 29, 2003

(86) PCT No.: PCT/EP03/50132

§ 371 (c)(1),
(2), (4) Date: Dec. 15, 2004

(87) PCT Pub. No.: WO03/093999

PCT Pub. Date: Nov. 13, 2003

(65) Prior Publication Data
US 2005/0149795 A1 Jul. 7, 2005

(30) Foreign Application Priority Data
May 3, 2002 (IT) ............................ SV2002A0018

(51) Int. Cl.
*G06F 11/00* (2006.01)
(52) U.S. Cl. ........................................ 714/11
(58) Field of Classification Search ................ 714/11, 714/15, 18, 32
See application file for complete search history.

(56) References Cited

U.S. PATENT DOCUMENTS

| | | | |
|---|---|---|---|
| 4,964,126 A * | 10/1990 | Musicus et al. | 714/797 |
| 5,008,805 A * | 4/1991 | Fiebig et al. | 700/79 |
| 5,125,090 A | 6/1992 | Rutherford, Jr. | |
| 5,630,056 A * | 5/1997 | Horvath et al. | 714/56 |
| 5,838,900 A * | 11/1998 | Horvath et al. | 714/56 |
| 6,058,491 A * | 5/2000 | Bossen et al. | 714/15 |
| 6,173,414 B1 * | 1/2001 | Zumkehr et al. | 714/6 |
| 6,510,531 B1 * | 1/2003 | Gibbons | 714/37 |

OTHER PUBLICATIONS

Profeta III et al.; *Safety-critical Systems Built with COTS*; Computer; vol. 29, No. 11; Nov. 1, 1996; Long Beach, CA; pp. 54-60.

* cited by examiner

*Primary Examiner*—Nadeem Iqbal
(74) *Attorney, Agent, or Firm*—James Creighton Wray; Clifford D. Hyra

(57) ABSTRACT

A processing/control apparatus has a first processing unit with a first data processor/controller; an input port for input data received from a remote unit; an output port for output data to be transmitted to a remote unit. The first unit comprising device for generating an unique code for functional control of the processing/receiving/transmitting steps being performed and a port for transmission of generated checkwords. A functional checker/protection unit comprises a second processing unit, a program for checking functional steps of the first unit and a program for checking the correctness of functional control codes and time sequence thereof. The functional unit communicates with the first unit and generates signals for enabling it when checkwords are correct and for disabling the first unit and/or for forcing transmission of predetermined output data for fail-safe remote unit control, or generates predetermined output data for fail-safe remote unit control and/or enables/disables vital functions of the remote unit and/or of the first unit.

21 Claims, 10 Drawing Sheets

INHERENTLY FAIL SAFE PROCESSING OR CONTROL APPARATUS

This application claims the benefit of Italian Application No. SV2002A000018 filed May 3, 2002 and PCT/EP03/50132 filed Apr. 29, 2003.

BACKGROUND OF THE INVENTION

This invention relates to an Inherently Fail Safe processing or control apparatus having a first processing unit with a first processor and a memory containing a predetermined data processing and/or control program;

at least one input port for input data received from at least one remote unit;

at least one output port for output data to be transmitted to at least one remote unit under the control of said first processing unit.

At present, even railway systems are controlled by computer-based control apparatuses.

This arrangement provides considerable system logic-related advantages. The system logic is reproduced by a set of algorithms and particularly by a set of the Boolean equations. The states of the various yard elements such as signals, switches, track circuits, etc. are controlled in the form of the Boolean variables, wherefrom the computer determines the state that said elements shall take in view of a train arrival or a new condition. The new states are also provided as Boolean variables to be transmitted as digital data to the local actuators of the different yard elements, which actuators change the received variables into corresponding control signals to be transmitted to the elements driven thereby.

Here, this computation task requires some power, but does not actually require a dedicated hardware construction of the processing unit. Hence, advantages would result from the use of processing units consisting of commercial, non application-specific hardware.

Nevertheless, the use of commercial hardware is currently not recommended for central control units of railway systems, which require Inherent Fail-Safe levels in determining vital controls.

The problem is similarly encountered in control devices of operating units, such as digital graphic subsystems, which replace the well-known panels or in data input subsystems, such as keyboards or in the control of other operating units that require the use of dedicated processing units.

In all the above cases, there are two problem levels. First, the output of the control unit must be safely forced to a safety state whenever a processing fault occurs in any unit involved in the control data output generation. A second aspect consists in that the currently available extra-fast processors have a cache which may store the input data of processing cycles occurred before the running cycle whereby, as a result of random or systematic faults, the microprocessor processing units may generate output control data from input data related to past, obsolete cycles, resulting in serious consequences.

The invention is intended to provide an Inherently Fail-Safe control apparatus that may use non Fail-Safe, low-cost and high-power hardware to execute all system logic-related calculations, i.e. to determine the system control data from input data, while ensuring Inherently Fail-Safe execution of vital functions.

SUMMARY OF THE INVENTION

The invention achieves the above purposes by providing an apparatus as described hereinbefore, in which:

the first processing unit further comprises means for generating unique codes for functional check of the processing and/or receiving and/or transmitting steps being performed (so-called checkwords) and a port for the transmission of the checkwords generated at each step;

a functional checker and protection unit is further provided, which consists of a fail-safe second processing unit, with a memory containing a program for checking the functional steps of the first processing unit and a program for checking the correctness of functional control codes (so called checkwords) and the time sequence thereof.

which functional checker and protection unit communicates, by a transmit and/or receive port, with the first processing unit, and generates enabling signals for it when checkwords are correct;

while the said functional checker and protection unit generates signals for disabling the activity of the first processing unit and/or for forcing the first processing unit to the transmission of predetermined output data for fail-safe remote unit control, or the said functional checker and protection unit generates itself predetermined output data for fail-safe remote unit control and/or signals for enabling/disabling vital functions of the remote unit and/or of the first processing unit which are transmitted to the remote unit and/or to the first processing unit.

Here the first processing unit is made of non Inherently Fail-Safe commercial hardware, whereas the checker and protection unit is made of proprietary dedicated hardware and provides checking functions on the first processing unit, which allow to check the correctness of all operations designed to act on the system's vital functions, whenever operation failures are detected.

Several checking and function execution modes may be provided, to achieve the desired safety level. These modes depend on the intended functions of the processing unit and on the operating units controlled thereby.

Nevertheless, in order to provide higher flexibility and lower fabrication costs, the checker and protection units have been provided with a checker subsystem, a protection subsystem, and a unit for interfacing with the operating unit/s, which varies depending on the hardware of the operating units. The checker and protection subsystems are always substantially identical as far as construction is concerned. However, processing unit checking programs may be different.

According to a preferred embodiment, the functional checker and protection unit has two separate units with two separate processors and is composed of a checker subunit, which performs functional check functions on the first processing unit, by running a checking program, and a protection subunit which only performs verification functions on check words and on the sequence thereof, and which controls the units for enabling/disabling the vital functions of the remote unit.

In order to ensure Inherently Fail-Safe operation, the checker subunit is also programmed in such a manner as to generate a flow of checkwords which describe its functional state and are uniquely related to the executed checking steps, which checkwords are transmitted to the protection subunit for a correctness and sequence check.

However, to obviate the possibility of using input data of past processing cycles, the checker subunit is programmed in such a manner that it generates a unique time stamp for each execution cycle of the processing program of the first processing unit. This time-stamp is changed/increased at each start of the processing cycle of the first processing unit and is transmitted by the checker subunit to the first processing unit at the start of each processing cycle of this first processing unit.

The first processing unit has a memory for the input data to be processed, typically the cache of the processor, which data is marked with the time-stamp of the current processing cycle, while all input data marked with the time-stamps of past processing cycles are cleared from the memory. Therefore, the memory is refreshed or reset at each processing cycle, and only the data marked with the current cycle time-stamp is maintained, while past cycle data is cleared.

In order that the input data is processed at least once, an improvement of the invention provides that all data input to the first processing unit is marked with the time-stamps of both the current and the next cycles, and that it is processed both in the current cycle and in the next one.

The safety condition may be obtained, for instance, by providing that the checker and protection unit acts on an interface for transmitting/amplifying the control data output from the processing unit, as soon as an operation failure of the processing unit is detected, thereby preventing data transmission to the operating unit.

This may be the case of a graphic processing subsystem for the control of video monitors. While the processing unit accomplishes the task of changing the input data into input data-related graphic symbols and of generating video monitor control signals, by means of graphic adapters associated thereto, the checker and protection unit checks the processing steps executed by the processing unit based on the checkword flow and, whenever an inconsistency is detected, it prevents any transmission/amplification of the display data output from the processing unit to the video monitors. Here, graphic adapters are not directly connected to video monitor inputs, but through a transmission/amplification interface of the checker and protection unit which is controlled by the checker and protection unit itself.

A similar arrangement may be provided for Inherent Fail-Safe check of data or controls entered from a keyboard. Here, functional check is directly performed from the keyboard and the control is only transmitted to the processing unit if the correctness check from the keyboard has had positive results. If a negative result is obtained, the keyboard, or the connection between the keyboard and the processing unit is disabled. In this example, the processing unit has the function of receiving the keyboard-input control and of generating an image on the video monitor.

For this echo function, in the embodiment as described and illustrated herein, the control of video monitors and the use of keyboards are implemented in a single processing subunit, with a single checker and protection unit.

A further application example of the Inherent Fail-Safe control apparatus of the invention consists of a Central Logic Computer, i.e. a computer whose function is to control the whole system, whereas secondary functions, such as graphic and keyboard input functions are assigned to processing subunits like the one mentioned above.

When using these computers are used, and due to safety reasons, processing is performed on two separate channels, with a synchronized control. The purpose thereof is to ensure that the required set of control data is always ready at the output, and that a processing channel is immediately operable and efficient as soon as a failure occurs on the other channel. Hence, inputs and processing are both handled in parallel, whereas output data transmission is only allowed from one of the two processing units.

Here again, processing is performed by a commercial hardware-based microprocessor unit, whereas the checker and protection unit not only checks that each processing unit operates correctly, but also determines which channel is currently enabled to output data transmission, still maintaining the other processing channel in a ready and operable condition. Computing channel redundancy is controlled in an Inherently Fail-Safe manner by the checker and protection unit.

It is possible and recommendable to provide a separate checker and protection units for each of the two parallel processing units, which checker and protection units communicate with each other to control the synchronization of computation functions of both processing channels and control output data redundancy, as mentioned above, even at the output.

Further improvements of the invention will form the subject of the dependent claims.

The characteristics of the invention and the advantages deriving therefrom will appear more clearly from the following description of a few non-limiting embodiments which are illustrated in the accompanying drawings, in which:

DETAILED DESCRIPTION OF THE PREFERRED EMBODIMENTS

While the example of the Figures relates to processing and/or control units of a railway station system, this invention shall not be intended to be limited thereby, as it is applicable to any processing apparatus that has to accomplish Inherently Fail-Safe functions and use non Inherently Fail-Safe hardware for developing processing algorithms.

Figure 1:
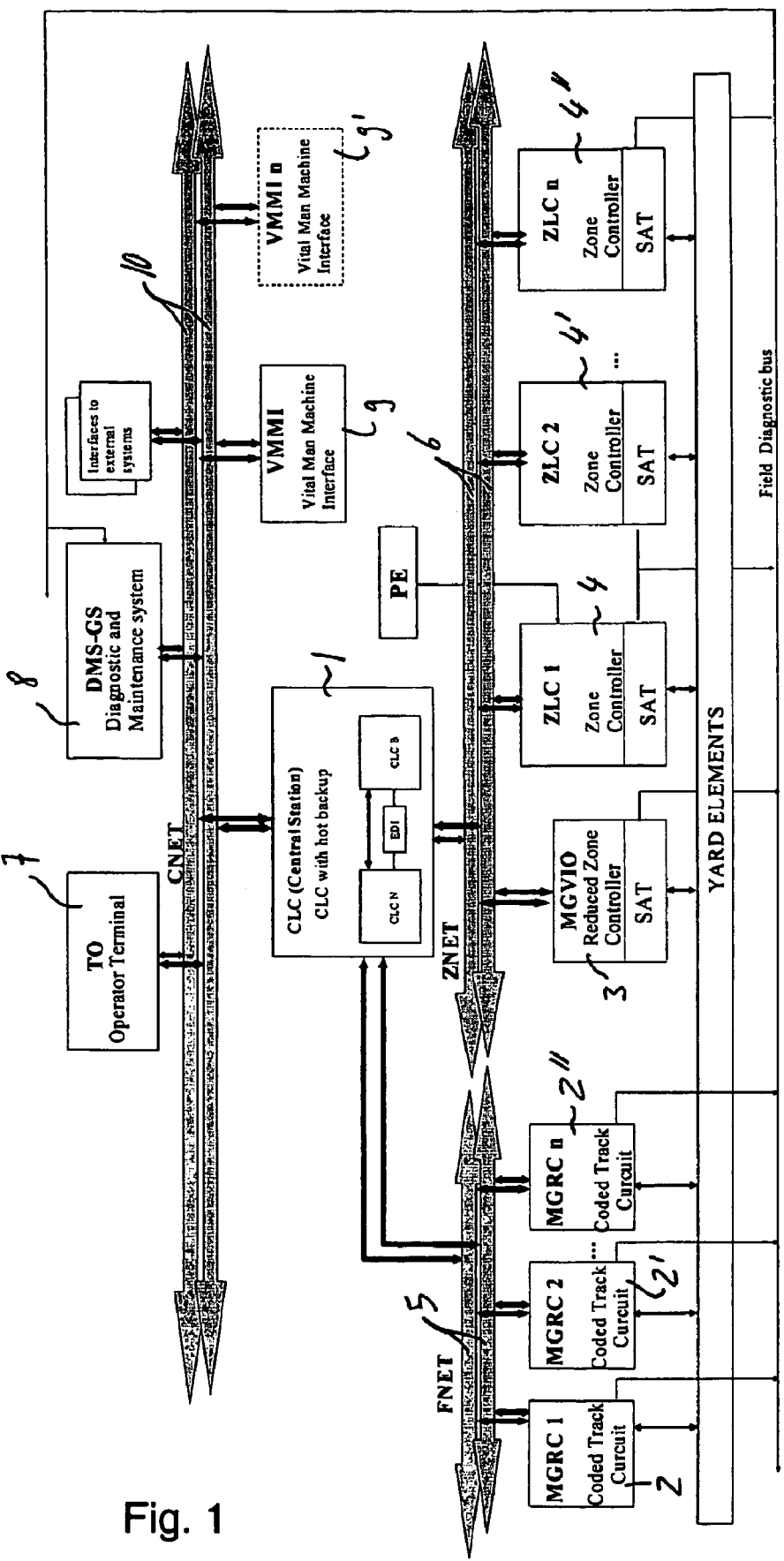
FIG. 1 shows a diagram of a typical station system, controlled by a computer system.

Referring to FIG. 1, the system as shown in the block diagram comprises multiple yard elements, such as track circuits, signals, switches and other remote actuator elements, e.g. code generating/receiving modules 2, 2', 2" (MGRC) which control the track circuits, a vital input/output management module 3 (VIOMM), zone logic computers (ZLC) 4, 4', 4", which communicate with a Central Logic Computer (CLC). Communication occurs by means of different types of networks, designated by numerals 5 and 6, and defined as Fnet (Field Network) and Znet (Zone Network) respectively. The Central Logic Computer 1 further communicates with an Operator Terminal 7, or OT, with a maintenance and diagnostics system 8, named MDS-GS and with one or more Vital Man Machine Interfaces 9, 9', named VMMI. Here communication occurs by a communication network 10 indicated as Cnet (Central Network).

As is apparent and will be described in further detail below, the Central Logic Computer 1 (CLC) has a double channel hot backup operation. This means that, as shown in FIG. 1, the computer 1 is composed of two Central Logic Computers 101, 201 (CLC N and CLC B) which perform parallel functions of input data collection from actuators or remote units 2, 2', 2", 3, 4, 4', 4", 7, 8, 9 and processing thereof to generate output data. Further, they control communications on the different communication networks 5, 6, 10 with different protocols and different safety modes.

The outputs of the two processing channels of the Central Logic Computers 101, 201 are controlled with a Fail-safe and hot backup operation, which means that both computers acquire input data and process them, but one of the two computers is not enabled to transmit output data. Nevertheless, the disabled computer is ready to take on the function of the enabled computer, either when it is controlled to do so, or when an operating failure occurs at the enabled computer.

Furthermore, several dedicated actuators or subsystems among those described herein may have a hardware/software structure according to this invention, i.e. comprising a commercial non Inherently Fail-Safe hardware-based processing unit, which is associated to a checker and protection unit which checks proper accomplishment of functions by the processing unit and, after this proper operation check, acts on interfaces or actuators designed to determine safety recovery of the remote or operating units controlled by the processing unit, thereby having the non Inherently Fail-Safe processing hardware and software assembly and the checker and protection hardware and software operate in an Inherently Fail-Safe mode.

Figure 2:
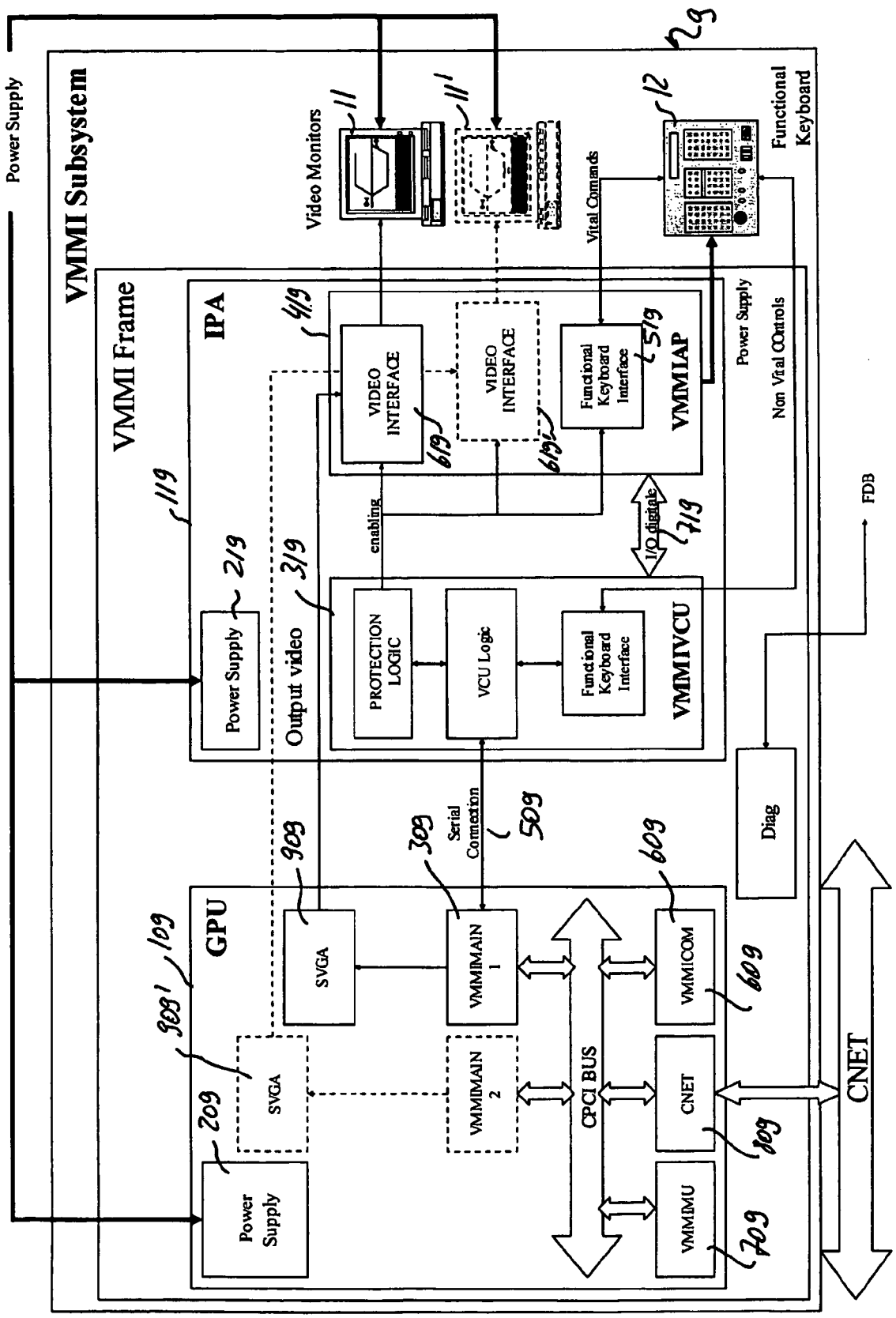
FIG. 2 shows a graphic processing and keyboard input subsystem for the so-called Virtual Man-Machine Interface (VMMI) as provided by this invention, and comprising a processing unit and a checker and protection unit.

A first example of these dedicated processing subsystems according to this invention is the Vital Man Machine Interface subsystem (VMMI), which is designated by numerals 9, 9' in FIG. 1, and is shown in greater detail in the diagram of FIG. 2.

The system is composed of a processing unit (Graphics Processing Unit, GPU) 109. This processing unit is specially designed for communication, processing and generation of images. The graphics unit GPU 109 uses commercial hardware and has a multiprocessor architecture based on a Compact Peripheral Component Interface bus (CPCI). This arrangement allows to use the computation capability, flexibility and configurability of the subsystem, while reducing development and manufacturing costs. The GPU unit 109 is also adaptable to any future developments and enhancements, in view of the development expectations of CPCI bus-based devices. The GPU unit does not have Inherently Fail-Safe characteristics.

Interfacing to other subsystems of the system, as shown in FIG. 1, is provided by a 10/100 Mbit/s Ethernet channel which is redundant on an availability basis, and allows to connect the subsystem to the system's CNET line 10. Subsystem information are provided to the operator by means of graphics displays 11. Each VMMI subsystem 9 can handle up to two stand-alone graphics displays 11, 11'; each graphics display may represent a synoptic chart or certain specifications defined in the configuration step. If a greater number of displays or operator workstations are required, the system shall be configured in such a manner as to have multiple Vital Interfaces VMMI 9, as shown in FIG. 1.

The operator interface further features a functional keyboard 12, which allows vital and non vital control input.

Subsystem state information and self-diagnostic test results are transmitted through the CNET network 10. A few concise diagnostic information, particularly regarding the functional keyboard is transmitted to the operator through an alphanumeric display, which is integrated in the functional keyboard 12.

The graphics processing unit 109 is in turn composed of several modules which accomplish several functions.

209 designates a supply unit which provides the required voltages to the various units.

The cards VMMIMAIN 1 and VMMIMAIN 2 (Vital Man Machine Interface Main), designated by numerals 309 and 309' are single slot 6U CPCI cards, which are defined as Peripheral CPUs. These cards are identical, except for the fact that only one of them is connected to the checker and protection unit 199, named IPU (Interface and Peripheral Unit). Typically, the cards use an Intel Pentium processor, or higher.

The VMMIMAIN cards 309, 309' may potentially use a variety of Operating Systems. The safety level required for vital processing operations performed by the VMMIMAIN unit forbid the use of a multitasking Operating System, operations being strictly cyclical and sequential. Therefore, a DOS environment is required for this card.

The Peripheral CPU cards have a particular bridge, named non transparent bridge (see e.g. DEC21554) which allows the system to be seen by the CPCI bus 409 as a single PCI agent. The PCI bus is accessed through a bridge that can generate PCI "Read Line" and "Read Multiple" cycles, which provide a high CPCI bus data block reading performance.

An EIDE interface (non shown) allows the VMMIMAIN units 309, 309' to be connected to an EIDE hard disk for factory start-up and BIOS setup. Alternatively, BIOS setup may be made through a floppy disk interface. A serial RS 232 EIA RS 232 channel 509 is available to allow connection with the IPU assembly 119.

The VMMIMAIN cards 309, 309' are designed to accomplish the following functions:
 FSFB/2 Safety layer. FSFB/2 is a layer of the communication protocol which is used to transmit vital information among the different subsystems, as shown in FIG. 1.
 Screen memory image reconstruction depending on the selected view and on the yard element state, as received by the subsystem CLC 1.

Check on the currently displayed image, based on the codeword value and on the screen memory state.

Input echo. Display of the echo of keystrokes typed by the operator on the functional keyboard 12.

Parsing and control construction. The VMMIMAIN checks that the keystroke sequence belongs to a valid control sequence and, upon recognition of the ENTER keystroke, forms and transmits the currently displayed control to the echo area.

Configuration data integrity check. A portion of configuration data is rechecked for corruption at every cycle.

Diagnostic Functions.

The Vital Man Machine Communication card (VMNICOM), designated by numeral 609 in FIG. 2 is a one-slot 6U CPCI card, defined as a System CPU. The VMMICOM 609 card is assigned all checking functions on low level communications with external subsystems, including the mass storage. The availability of one PMC or PC-MIP slot (not shown in detail) is a preferred feature. The PCI bus is accessed through a bridge that can generate PCI "Read Line" and "Read Multiple" cycles, which provide a high CPCI bus 409 data block reading performance. This card accomplishes the function of controlling accesses to the CPCI bus 409. An EIDE interface (not shown) allows the VMMICOM cards 609, 309' to be connected to an EIDE hard disk for factory card start-up and BIOS setup. Alternatively, BIOS setup may be made through floppy disk interfaces. The VMMICOM card 609 requires a large memory area for screen page swap. The swap section allows to store the screen pages that are not currently displayed; this unit does not necessarily have a physical, biunique correspondence with a component but not only can be provided as a memory expansion on the CPCI bus, but is also allocated as an internal resource, to each VMMICOM unit 609 and VMMIMAIN unit 309, 309'. The swap section must be made of RAM and have such a size as to contain 15 Mbytes for each station view to be displayed.

The Vital Man Machine Interface Memory Unit (VMMIMU), designated by 709 is designed for supporting devices for storage of subsystem configuration data and of the application code used by the different microprocessors of the Graphics Processing Section GPU 9. In a particular preferred embodiment, storage devices meet the following minimum requirements: PCMCIA II format; Data transfer rate to/from flash=4 MB/sec; A size of up to 1 GB, which may vary depending on the application. The VMMIMU card may be provided in a 6U, 3U CPCI format, with the 6U panel being fitted thereon, or in a mezzanine PCI format (PMC or PC-MIP).

The VMMIMU card 709 allows front access to 2 ATA flash disks 2 in a PCMCIA II memory card format (not shown). The two flash disks separately contain the system configuration data and the application software, thereby ensuring independence between code data and application data.

Mass storage is accessed, in read-only mode, when the subsystem is turned on or during a reset.

The CNET Controller card 809 makes the redundant 10/100 baseT Ethernet interface available, and allows connection of the Graphics Processing Unit GPU 9 with the HUB SWITCH of the CNET network, thereby ensuring physical redundancy of the communication line. The CNET card may be provided in a 6U, 3U CPCI format, with the 6U panel being fitted thereon, or in a mezzanine PCI format (PMC or PC-MIP). No application software is installed on the CNET Controller card. Connection redundancy is wholly controlled by low-level drivers, by associating a single IP address, corresponding to a single TCP logic stack, to both channels, whereby this function need not be controlled by an application software.

The SVGA card 909, 909' is designed for transfering the video processed by VMMIMAIN 309, 309' to graphics displays 11, 11', and is an exclusive resource of the VMMIMAIN card 309, 309'. Preferably, the video controllers in use meet the following minimum requirements: 4 Mbytes SGRAM (Synchronous Graphics RAM), a resolution of 1600×1200 pixels, and 256 colors (8 bits per pixel); a PCI interface (PMC, PC-MIP or CPCI format). Connection is provided at the front, by means of a standard RS343A VAG connector.

The SVGA cards 909 are connected with the outputs of the monitors 11, 11' through a communication interface which is supervised by the checker and protection unit.

The checker and protection unit IPU 119 is specially designed for protection functions and uses proprietary, ad hoc hardware, unlike the Graphics Processing Unit GPU 109. This arrangement is determined by the need to obtain a fail-safe macro component which might accomplish protection functions and by the need of implementing certain hardware solutions with vital modes that might not be ensured by commercial hardware, as described hereafter. The checker and protection unit 119 is designed to control the processing results of the Processing Unit GPU and to protect the system against safety related failures. It includes some Inherently Fail-Safe hardware functions, hence it is composed of specially constructed cards.

Therefore, while the Graphics Processing Unit GPU, designated by numeral 109, only accomplishes checking functions, the checker and protection unit IPU designated by numeral 119 accomplishes all protection functions, as well as the checking functions related to the management of the displays 11, 11' and of the functional card 12.

The checker and protection unit, which is named Interface & Peripheral Unit (IPU) and is designated by numeral 110 has a power supply 219 and two main modules: the Vital Man Machine Interface Vital Control Unit module (VMMIVCU), designated by 319 and the Vital Man Machine Interface Application module (VMMIAP), designated by numeral 419.

The VMMIVCU module 319 is a proprietary module which is designed for both checking and protection functions. This module has the function of concentrating all the checkwords provided by the subsystem, checking the proper sequence thereof and providing the GPU with an appropriate time-stamp, as well as a vital contribution for the performance of graphics processing operations, which vital contribution is later used during the transmission of remote vital variables to certify proper operation; the VMMIVCU controls the serial RS232 interface 509 for connection of the Graphics Processing Unit GPU 9 and the non-vital interface with the functional keyboard 12;

The VMMIVCU is interfaced with the VMMIAP application module 419 through a general purpose digital port 719. The VMMIAP module 419 allows to specialize the IPU for the specific Vital Man Machine Interface VMMI application. Particularly, the module acts as a physical interface with the functional keyboard, as shown by the functional block 519 and with the graphics displays as shown by the functional blocks 619, 619'. The VMMIAP module directly receives voltages for the video monitors 11, 11' and the interface to the functional keyboard 12 from the protection section on the VMMIVCU module 319, as is described in greater detail hereafter.

Figure 3:
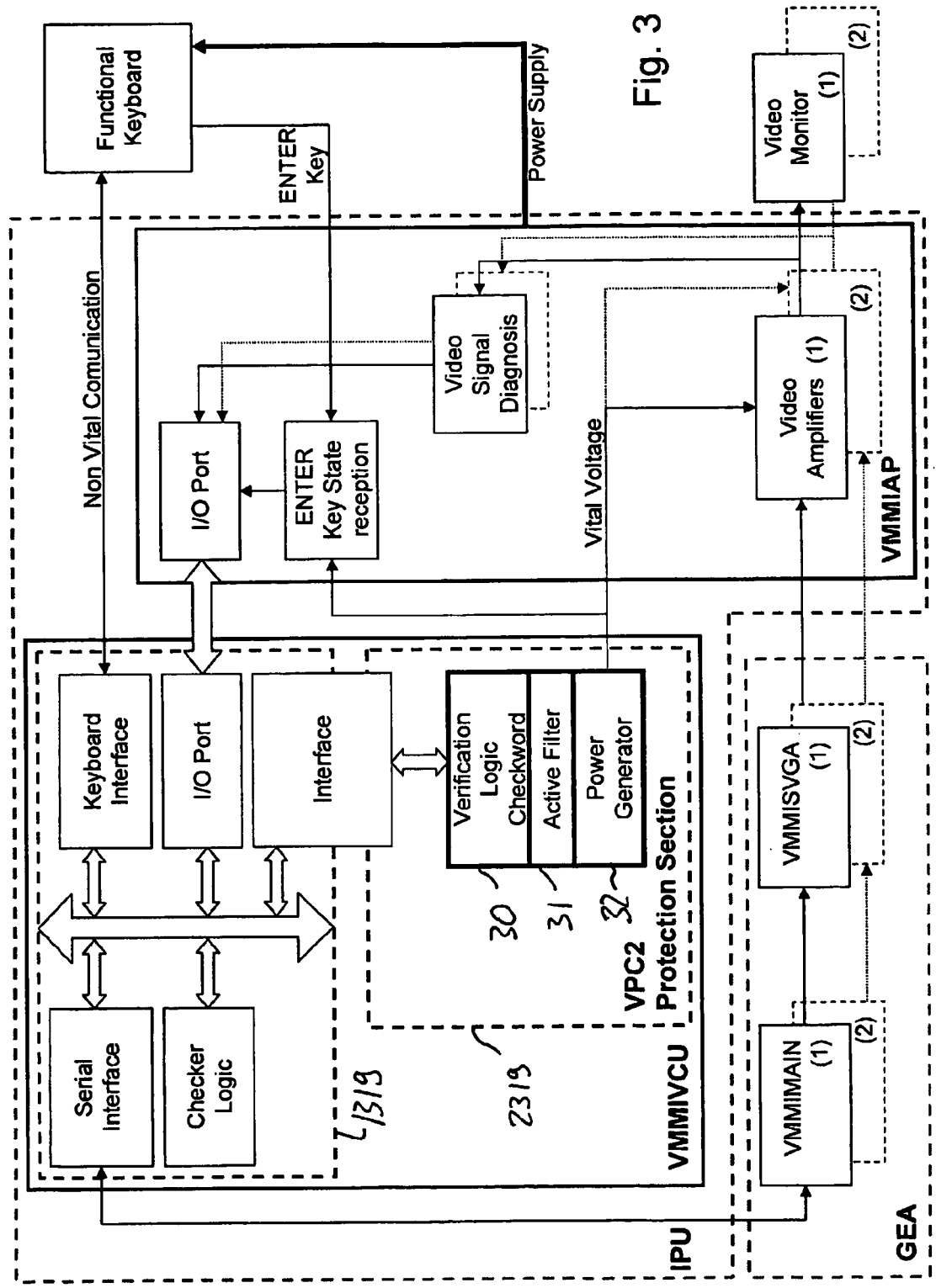
FIG. 3 shows a more detailed block diagram of the checker and protection unit of the VMMI subsystem as shown in FIG. 2.
Figure 4:
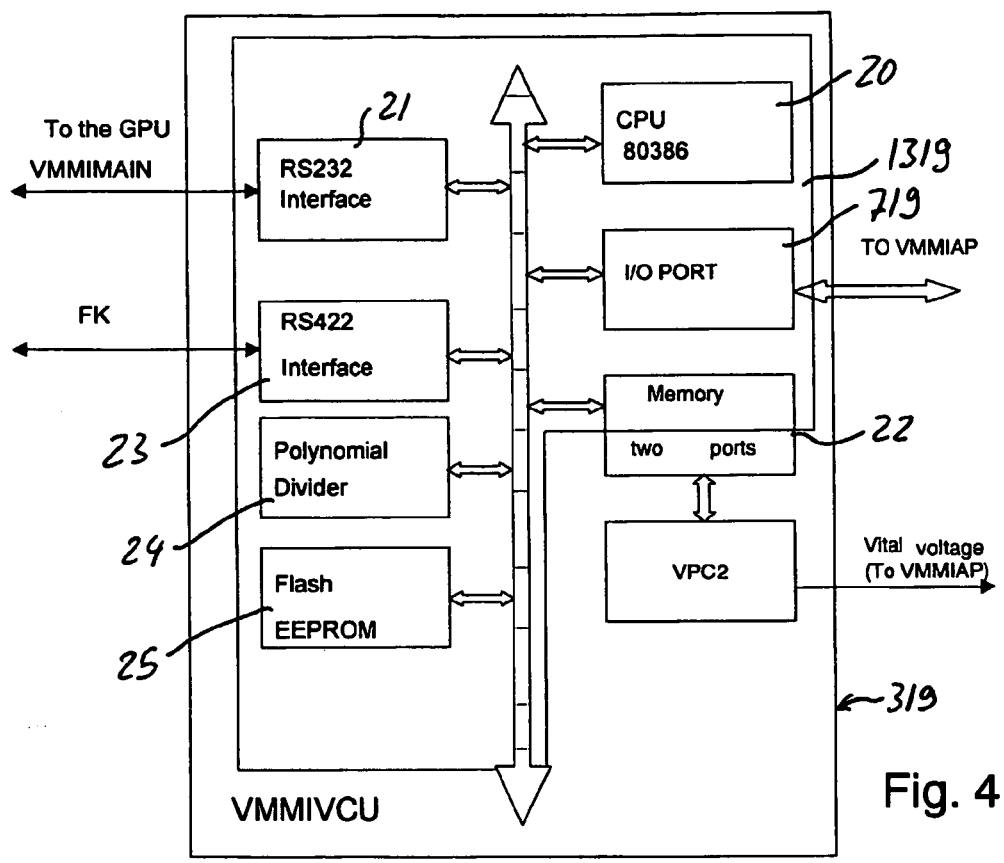
FIG. 4 and FIG. 5 show more detailed block diagrams of the checker and protection subsystems which form the protection and checker unit as shown in FIG. 3.
Figure 5:
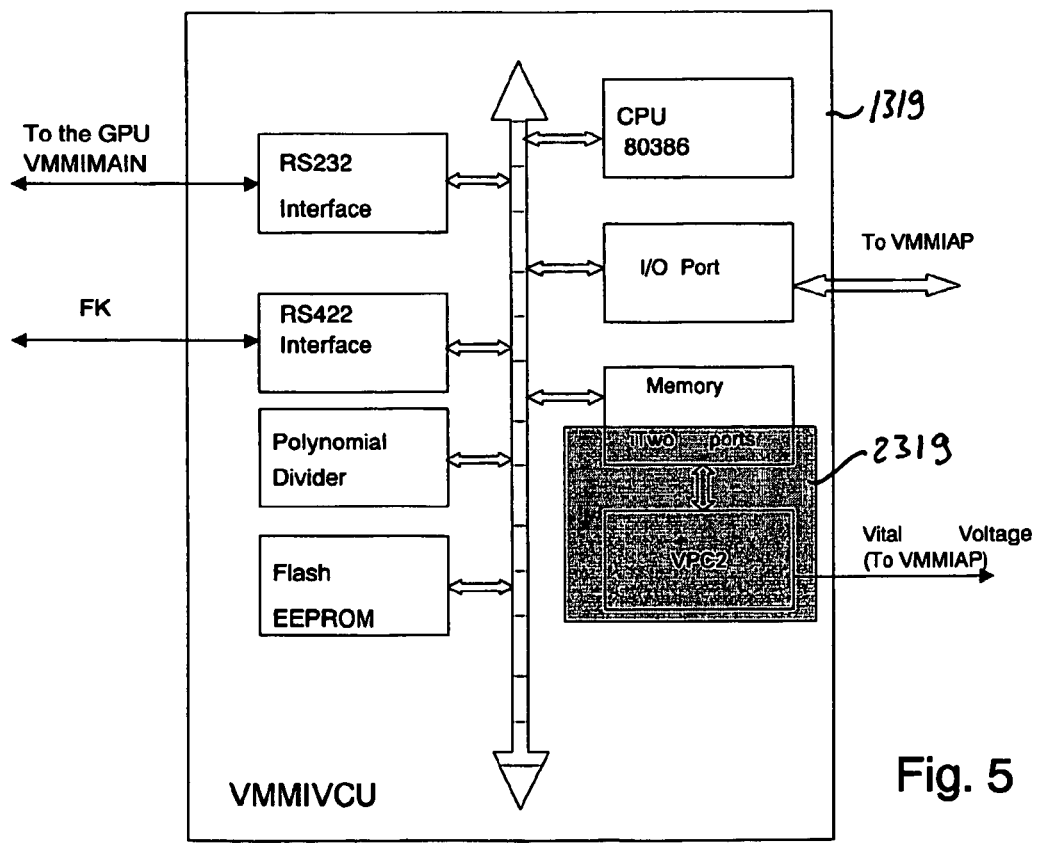

FIGS. 3 to 5 show in greater detail the structures and features of the component units of the checker and protection unit 119.

As is apparent from these Figures, the VMMIVCU checker and protection module 319 is composed of two separate sections, a first checker section 1319 and another section, named VITAL POWER CONTROLLER 2 (VPC2) which is dedicated to the protection function and is designated by numeral 2319. The principle of this Inherently Fail-Safe microprocessor unit architecture is known, for instance, from U.S. Pat. No. 4,553,200, which is intended as a part of this description.

In FIG. 4, the functional blocks of the VMMIVCU module 319 that belong to the checker section 1319 are shown in grey.

The VMMIVCU processing logic is physically obtained by means of an Intel 80386 processor, designated by numeral 20. This arrangement provides the required processing power by using a simple architecture processor. The VMMIVCU processing logic accomplishes the following functions:

Synchronizing the processes of the GPU Graphics Processing Units, and the IPU checker and protection unit 119. At every processing cycle, the logic of the VMMIVCU 319 produces a vital time-stamp which is referred to as subsystem's VSN (Vital Sequence Number). The VSN is a value that progresses, cycle after cycle, through a predetermined succession of states. The VSN is used as a time reference by all the checker section modules, both of the Graphics Processing Unit GPU and of the IPU checker and protection unit. As is better explained in the functional description, the VSN time-stamp provides protection against the presence of obsolete data in the processors which use a cache, and particularly in the VMMIMAIN card 309, 309'.

The communication with the GPU Processing Unit 109 occurs through the dedicated asynchronous RS232 communication line and provides the transmission of the following information:

from the GPU to the IPU: the checkwords produced by GEA-resident vital algorithms. The CPU 20 reflects this information to the protection module VCP2 2319;

from the IPU to the GPU: all data acquired from the functional keyboard, as well as the VSN time-stamp generated by the IPU checker and protection unit at every processing cycle.

The 386 CPU 20 transmits the checkwords produced by the algorithms contained in the Graphics Processing Unit GPU and in the IPU checker and protection unit, through a two-port memory 22, to the VPC2 protection section 2319. Memory accesses are synchronized with the help of flags;

The checker section 1319 communicates with the application module (VMMIAP) 419. This communication occurs through a parallel general purpose digital port 719 and the exchanged information includes: the coded state of the ENTER key, as acquired by the VMMIAP; the result of the non vital diagnostic tests performed on video amplifiers.

Communication is obtained by the dedicated asynchronous RS232 communication line 23 and provides the transmission of the following information: non vital keystroke data, acquired by VMMIVCU from the functional keyboard 12; the data directed to the display of the functional keyboard 12, as provided by VMMIVCU;

A polynomial divider 24 is also provided, to perform hardware polynomial division functions. This function is widely used by dedicated checkword generating algorithms (see U.S. Pat. No. 4,553,200) and is also used, as described below in greater detail, to generate VSN time stamps.

Hardware implementation of the polynomial division algorithm allows to accelerate all vital algorithms residing on the VMMIVCU logic.

A Flash EEPROM 25 is used to contain the application code and the configuration data as used by the VMMIVCU processing logic.

The two-port memory 22 acts as a physical interface between the checker logic 1319 and the protection logic 2319. The information exchanged across this area, as well as certain configuration parameters and synchronization flags, are only the checkwords produced by the algorithms that reside on the different logics of the checker section.

The VMMIVCU module 319 has a few I/O ports for non vital functions, such as the control of on-board state and diagnostics LEDS and as ports for SW download.

In FIG. 5, the functional blocks of the protection section 2319 are shown in grey. This section includes the VPC2 module which is interfaced with the CPU 20 of the checker section through a two-port memory. The VPC2 component has the function of only providing vital output voltage if the expected checkword flow is present at its input; this component consists of a 8085 microprocessor which executes the ckeckword checking logic 30 (FIG. 3) and an Inherently Fail-Safe vital filter 31.

As a result of the validation by the logic residing on the microprocessor 30, two signals are generated toward the vital filter 31, which have precise waveform characteristics (square waves with different frequencies and duty cycles). These signals are used by the vital filter for power generation 32, 1.5 W at 12V.

Vital Voltage is only generated if the checker section cyclically provides, every 50 ms, the so-called checkwords, by using the shared memory 22.

At every 50 ms cycle, named recheck-cycle, the protection section 2319 acquires the various checkwords provided by the checker section 1319 and processes checkwords while providing the Vital Voltage, based on their value, by acting on the active filter.

As a result of the validation by the logic residing on the microprocessor 8085, two signals are generated toward the vital filter 31, which have precise waveform characteristics (square waves with different frequencies and duty cycles, at 5 kHz and 500 Hz respectively, having a well defined phase relation). These signals are used to generate a vital voltage used by the VMMIAP. Every 50 ms, the waveforms are cyclically regenerated based on the checkwords received by the checker section.

During the correctness or consistency check, the checkword verification logic consumes checkwords in a destructive manner, thereby ensuring that a given set cannot be used more than once. The Active Vital Filter (AVF) block 31 ensures the provision of a 5 kHz output frequency (the enabling signal is only transmitted to the VG (Vital Generator) 32 if the two input frequencies from the checkword verification logic have the expected frequency and duty-cycle characteristics. This block is made with Inherent Fail-Safe analog circuits. The active filter output is used as an enabling signal for the Vital Generator (VG) 32; this is a power supply which is supposed to generate a Vital voltage of +12.5 VDC, with a maximum available continuous output of 1.5 W. An Inherent Fail-Safe DC-DC conversion circuit is implemented in the generator, which has such characteristics as to only ensure the generation of Vital voltage when an enabling signal is provided by the active filter 31.

The Vital Man Machine Interface application module (VMMIAP) 419 consists of a proprietary card which accomplishes VMMI application-specific functions. Particularly, this card controls the ENTER key state acquisition from the functional keyboard; the power supply to the functional keyboard 12; ensures insulation of interfaces to the operator, when no vital voltage is present.

The VMMIAP application module 419 receives from the protection section 2319 the safely generated voltage as a subsystem operation approval. This module uses the vital voltage to operate the video amplifiers 619, 619' and the interface circuits 519 to the ENTER key of the functional keyboard 12.

When no approval is given by the protection section 2319, the module 419 ensures that if a set of wrong checkwords is detected, the vital voltage drops below a predetermined threshold within a maximum time of 400 ms. This allows: to cancel a wrong image in a predetermined response time of is, which includes the cycle times of the subsystem, and to disable vital controls, as the ENTER key state detection circuits are disabled.

The interface with the VMMIVCU card is made of a general purpose digital VMMIAP I/O port 719 (FIG. 2).

Figure 6:
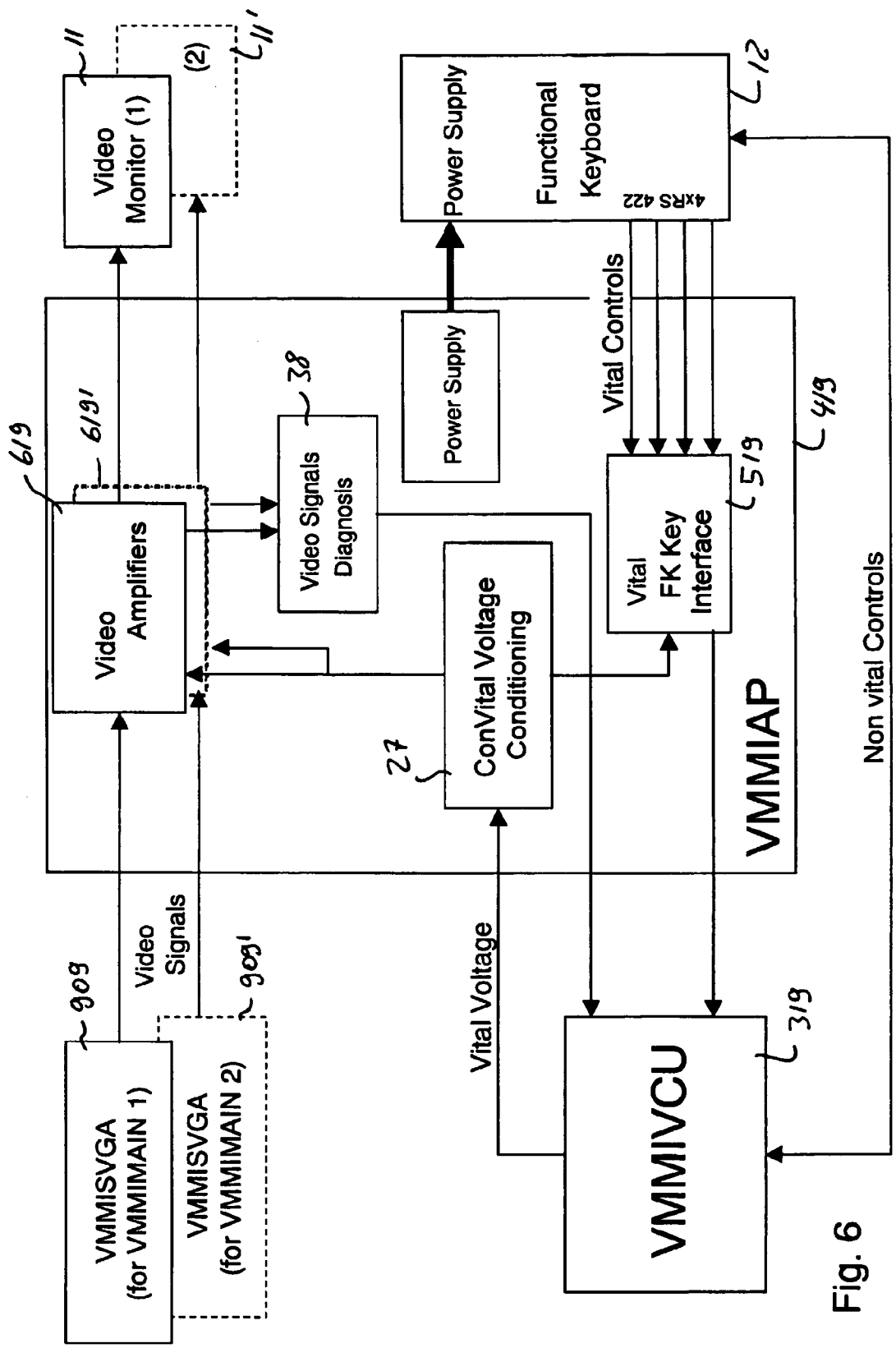
FIG. 6 shows a block diagram of the application section, i.e. the interface with the remote units of the checker and protection unit as shown in the previous Figures.

A functional block diagram of the VMMIAP application block 419 is shown in FIG. 6, which highlights in grey the safety-related functional blocks.

The numeral 27 denotes the Vital Voltage conditioning circuits allocated to the VMMIAP 419. These circuits only have the function to generate specific voltages for video amplifiers 619, 619' and for the interface with the vital keys of the functional keyboard 12, from the Vital Voltage of 12 V generated by the VPC2 2319 to the VMMIVCU module 319. The vital interface 519 with the functional keyboard 12 is designed to interface with an ENTER key coding circuit, which is not shown in detail and is mounted on the functional keyboard 12 to detect the state thereof. The functional keyboard 12 has both normal operation controls and emergency controls. The keys are divided into homogeneous sets, depending on their functions; the various sets are arranged from left to right, according to the control input logic. The ENTER key state acquisition logic is designed with Inherently Fail-Safe criteria. The FK further integrates an alphanumeric display, two ringers and a three-position enabling key. The architecture of the functional keyboard is composed of three different boards, connected by a flat cable, a board containing the buttons and the key; a board containing the LCD display; a control board which is a CPU and uses a 16 Mhz Intel 80C51FA1 microprocessor.

The interface is physically composed of 4 serial EIA lines 422, which are used as follows:

INV_OPEN: 32 bit coding of open key status.
INV_CLOSED: 32 bit coding of closed key status.
BIT_CLOCK, WORD_CLOCK: used to transmit synchronism information (bits and words).

The power supply to differential receivers used for the data channel is provided by the VPC2. Hence, a VPC2 failure prevents the generation of vital controls, by intercepting the ENTER key status coding. The VMMIAP card 419 transfers the 5V voltage to the Functional Keyboard 12. The amplifiers 619, 619' have the function to amplify the R/G/B video signals transmitted to the video monitors. They are operated by the Vital Voltage generated by the VPC2 2319. The lack of Vital Voltage causes video signals to disappear. The VMMIAP module 419 houses 6 amplifiers 619, 619', whereby it can control the three color component signals for two graphics displays.

The VMMIAP 419 also includes a video signal diagnostic module 29 which samples the signal level at the output of video amplifiers 619, 619', synchronized with the video synchronization signal as soon as the first pixel line of the video is refreshed. This line is also controlled assigned a bright white color by the application software; by reading the video signal generated when the first line is displayed, a proper color balance may be performed.

The operation of the above system is as follows:

The system can display the synoptic views that the operator selects through the Functional Keyboard. The views are reconstructed by the GPU Graphics Processing Unit 109 based on the data received by the Central Logic Computer CLC, designated by numeral 1 in FIG. 1. The Functional Keyboard allows to generate vital and non vital controls, whose echo is displayed on the monitors, and which are transmitted to the Graphics Processing Unit GPU 109 for transmission to the Central Logic Computer CLC 1.

During this process, checking and protection operations are performed by the VMMIVCU checker and protection unit 119. First, during each processing cycle of the Central Logic Computer, which lasts about 500 ms, certification checkwords are generated every 50 ms for data transmitted to the Graphics Processing Unit GPU 109 as well as checkwords for rechecking the graphic views reconstructed therefrom and present in the screen memory. The Graphics Processing Unit further executes a recheck operation for system setup data and for the application processing code contained in the VMMIMU memories, and generates an internal invariant checkword. An invariant checkword is also generated as a result of an input data consistency check against the data displayed by the monitors 11, i.e. the processing unit output data. All the checkwords are further associated, i.e. marked, with the VSN time-stamp of the running processing cycle. The checkwords generated thereby are transmitted by the checker section 1319 of the VMMIVCU checker and protection unit to the VPC2 protection section 2319 which only performs a checkword verification. If checkwords are wrong, the protection section cuts off the Vital Voltage to the amplifiers 619, 619' which receive signals from the SVGA graphic controllers 909 of the Graphics Processing Unit 109, thereby preventing these signals from being displayed.

VSN time marking has the effect of preventing past processing cycle data from remaining in the Graphics processing unit processor cache, so that the output data computed by the Graphics processing unit cannot be inconsistent with the actual situation. Here, VSN time marking allows to obviate this drawback. Vital data are assigned a VSN number on a XOR basis, which uniquely identifies the current processing cycle. Therefore, the lifetime of marked data will be equal to a processing cycle.

This function is accomplished by a time stamp generator which is a feature of the checker section. The generation of time stamps and the communication thereof to the Graphics Processing Unit and/or to the Functional Keyboard 12 controlling unit represents the start of a new processing cycle, and allows synchronization of various system processes.

The VSN time stamp belongs to a pseudorandom sequence generated by successive polynomial divisions from an assigned seed. This generation mode ensures the variation of a sufficient number of bits between two successive VSNS.

Time stamps are generated in redundant computation mode with a vital time break diagnostic. The detection of proper operation of the VSN time stamp generator is based on the algebraic properties of the binary string polynomial division operation, which consist in that the polynomial division function on a string of N bits may be simulated by a matrix calculus. Here, the checking algorithms includes the determination of an invariant checkword and the transmission thereof to the protection section, whereby it certifies the proper operation of the VSNG mark generator.

Regarding the Functional Keyboard, checkwords are generated which assess correctness of the ENTER key, i.e. the key that the operator strikes to mean its will to transmit a vital control. In this case, the vital control is time marked and validated by the protection section before being transmitted to the Graphics Processing Unit GPU 109 to be further transmitted to the Central Logic Computer CLC 1. Time stamps ensure that the transmitted control is synchronized with the processing cycle of the Graphics Processing Unit GPU 109 and with the Central Logic Computer CLC 1. If the control time stamp is found to be inconsistent with the one of the Graphics Processing Unit, then the control is not transmitted or executed. The control is further rechecked and, as a result, checkwords are generated, also by generating codewords depending on the Functional Keyboard keystrokes, which are themselves submitted to the protection unit for validation. If checkwords are wrong, the protection section acts on the power generator of the VMMIAP module 419 and cuts the Vital Voltage to the keyboard.

Back to FIG. 1, the Central Logic Computer subsystem CLC, designated by numeral 1, is specially designed for fail safe processing of the system logic, based on the status of the yard elements 2, 2', 2", 3, 4, 4', 4" and on the controls input by the operators 7, 9, 9'.

The subsystem CLC 1 was designed as a general application to meet all the control requirements for physically different yards, possibly managed by different principle diagrams. Therefore, the system was designed to execute any Boolean equation-defined system logic. This is a cyclic subsystem, and the cycle time whereon the vital output status refresh is based is named main-cycle an lasts 500 ms. The Boolean equations used to determine the logic of a certain system are factory defined, as a function of the station topography, ad of applicable handling rules, and are further translated into data structures, by means of special configuration tools. The equation related data structure allows to configure the subsystem for any application with no need to make any change to the processing software. The CLC 1 is connected with the other subsystems by the networks CNET 10, ZNET 6 and FNET 5. Through these channels, and by using appropriate application-level proprietary protocols, the CLC 1 can exchange logic-related variables and diagnostic information with them. The Central Logic Computer 1 is an essential unit for accomplishing the main functions of the system. Therefore, in order to provide high availability, it is composed of two symmetric processing units 101, 201, disposed in a hot backup configuration, as shown in FIGS. 1 and 7 to 10. The two processing units 101, 201 are named CLC N (Central Logic Computer—Normal) and CLC B (Central Logic Computer—Backup). The two processing units 101, 201 can individually and safely accomplish the functions of the CLC 1, and particularly parallel input acquisition and independent Boolean Equation solution, but the results thereof are only transmitted in a mutually exclusive manner from one of the two processing units 101, 201.

Each processing unit 101, 201 can take the following operational states:

Operating: the operating processing unit is the one that determines the new status of the output variables, based on the received data, and transmits these variables to the remote units 2, 3, 4, 7, 8, 9;

Available: the available processing unit performs the same operations as the operating unit, except that, once that the equations have been solved, it aligns its outputs and its internal status with those of its twin processing unit and is prevented from transmitting the outputs to the remote units. Whenever the "operating" processing unit fails, this unit is ready to replace it, and to enter in the "operating" mode;

Idle: this state describes the initialization of a processing unit, and may be entered by a unit as a result of failure detection, or when the system is powered on;

Off: Powered off system.

The Central Logic Computer CLC 1 includes a device that allows to associate the "operating" state to only one of the two processing units 101, 201, N and B, so that vital variable transmission can be controlled by only one of the two units, whereas the other is aligned to the former.

When normally operating, each processing unit 101, 201 generates output and internal state variables in an independent manner. The above variables may differ because different input values may be used, as the input acquisition process is totally independent. In order to obviate this system logic misalignment and to ensure operation continuity when switching between the two processing units, the latter cyclically mutually exchange the output and internal state variables determined by each of them, and select and use the same set of variables, which may be the locally generated set or the set received from the other unit.

Data exchange and alignment functions use internal dedicated communication units that link the two processing units CLC N 101 and CLC B 201. The switching process, i.e. the transition of the processing unit from the "available" state to the "operating" state may occur as a result of:

a failure: the formerly "available" processing unit 101, 201 detects the 'failure' of the formerly "operating" processing unit (101, 201), and takes its place;

a request: the processing unit 101, 201 in the "available" state switches to the "operating" state and vice versa. This is determined by a manual, local or remote switching control, or as a result of an automatic request that is provided to prevent a processing unit 101, 201 from remaining in the "available" state beyond a certain time, which might hinder full detectability of latent failures on the unused unit. The automatic request also causes switching when the "operating" unit is in a "worse" operating condition than the "available" unit. In this case, the "operating" unit 101, 201 will request switching to use the data produced by the processing unit 101, 201 with the lower degradation degree.

Figure 10:
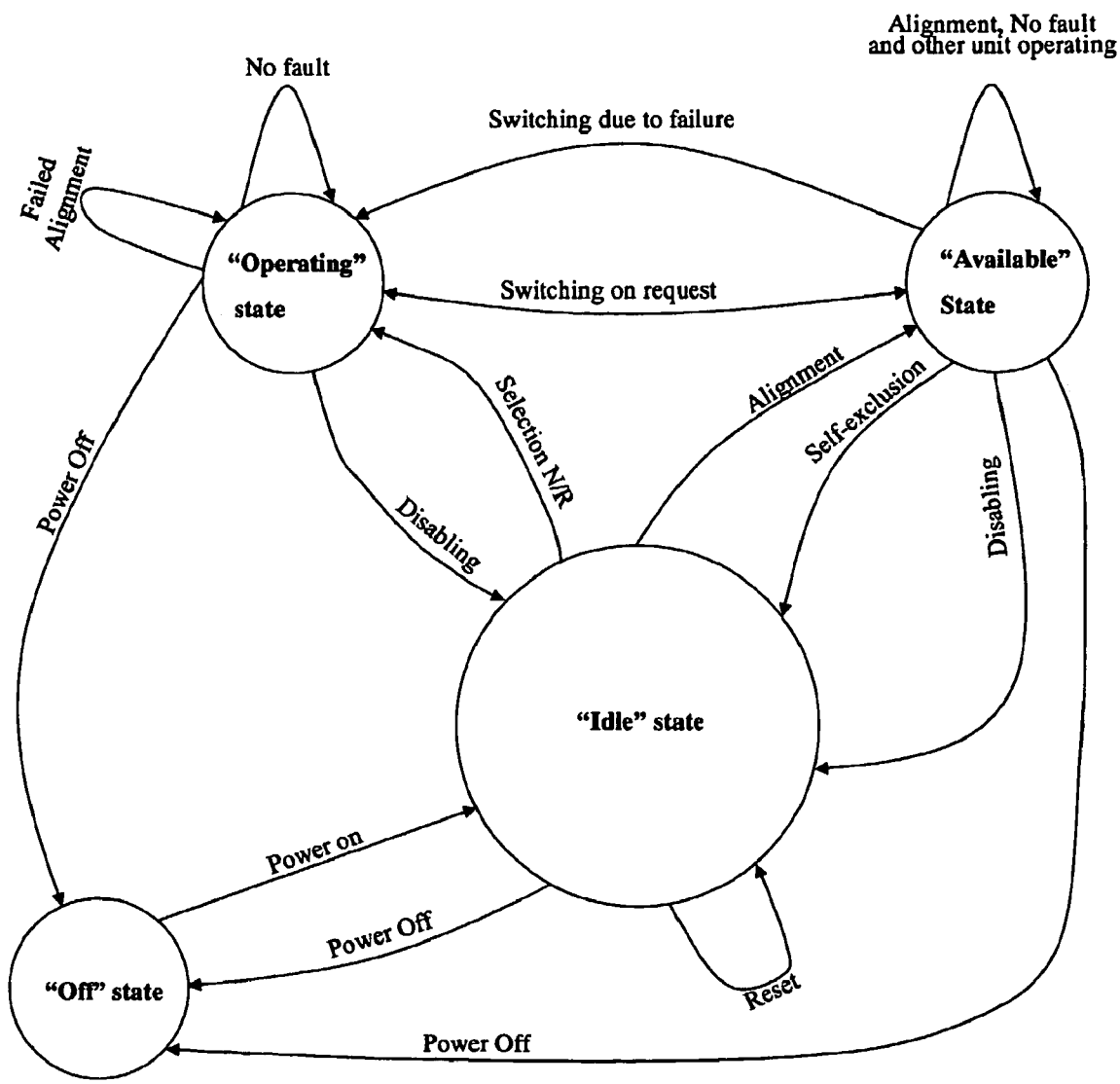
FIG. 10 shows a flow chart of the Central Logic Computer (CLC) data between the two processing channels (CLC N and CLC B).

The above redundancy control modes are graphically illustrated in the scheme of FIG. 10.

The Central Logic Computer CLC 1 includes a basic diagnostic interface, named BDI, and designated by numeral 301. Through this interface, the operator can gather basic information about the state of the processing units, CLC N 101 and CLC B 201, and can set one of them to the "operating" state.

The subsystem shall support diagnostic functions to allow failure detection. Further, the Central Logic Computer CLC 1 shall manage the Event History Log variables, already wired in the logic, and a few monitoring variables that are useful for proper operation check. This information shall be transferred to the Diagnostic and Maintenance system MDS GS 8, together with general diagnostic information of the Central Logic Computer CLC and other nodes connected to the networks ZNET 5 and FNET 6, which cannot communicate directly with the Diagnostics and Maintenance system DMS GS 8.

The Central Logic Computer CLC 1 shall have interfaces to connect it with the redundant network CNET 10, and with multiple redundant networks ZNET 5 and FNET 6. Through these networks, both the processing unit 101 CLC N and the processing unit 201 CLC B acquire in parallel remote vital and non vital inputs from the different nodes and from the different remote units 2, 3, 4, 7, 9 and transmits thereto the value of the cyclically determined outputs. It shall be noted that the transmission phase is only designed for the "operating" processing unit 101, 201.

Obviously, each processing unit 101, 201 shall be able to connect with either of the lines which form each network. The CNET, ZNET and FNET networks are closed communication networks, and are only shared by proprietary applications. This arrangement allows to reduce unauthorized intrusions and to make network traffic predictions.

The use of a redundant architecture for the Central Logic Computer CLC 1 involves the need of associating an operating 'state' to each of the two processing units which compose it, the Normal CLC 101 and the Backup CLC 201. This state must be safely detected by each processing unit 101, 201, as this function involves the selection of the data produced by the local computation section or by that of the other processing unit. Further, the processing units 101, 201 shall be prevented from evaluating in non aligned manner.

Figure 8:
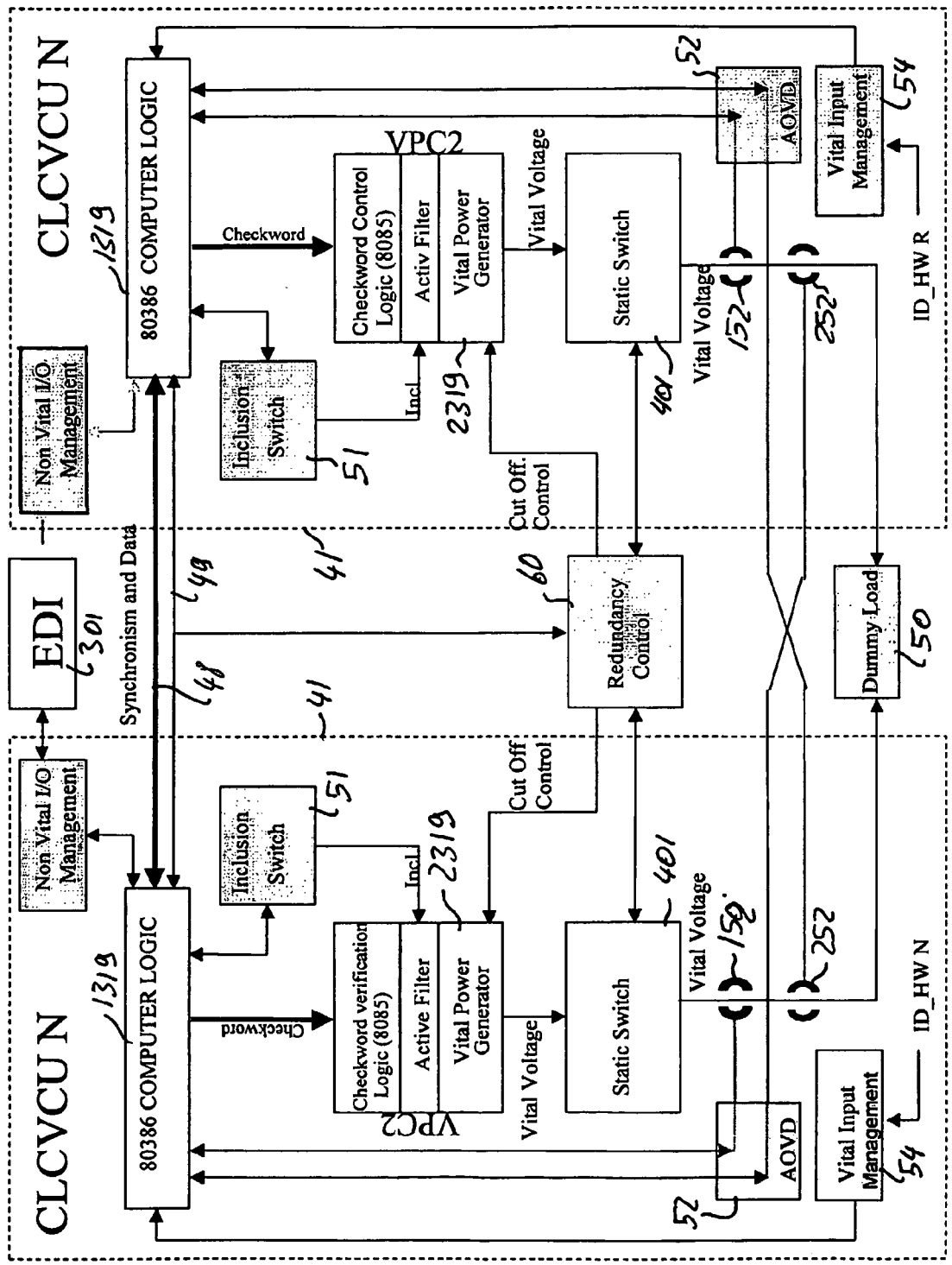
FIG. 8 shows a more detailed block diagram of the architecture of the two checker and protection units, named Central Logic Computer Vital Control Units (CLCVCU).

In order to control redundancy, each processing unit 101, 201 is provided with a protection circuit VPC2, designated by numeral 2319, which is identical to the circuit of the protection section 2319 of the previous example, and with a static switch, designated by numeral 401 in FIG. 8. Each VPC2 protection section 2319 receives at its input the various certifications to confirm proper operation of the vital parts of each processing unit and provides a Vital Voltage at its output. If the certification flow is correct, with no interruption, the processing units 101, 201 provide an output Vital Voltage to their own VPC2 protection section 2319, but a static switch 401 is placed downstream therefrom to only allow voltage output to one of the two processing units 101, 201. Therefore, two branches are obtained, on which a Vital Voltage may or not be present, and the detection of this voltage downstream from the switch 401 allows to determine if the processing unit 101, 201 is or not in the "operating" state.

Figure 7:
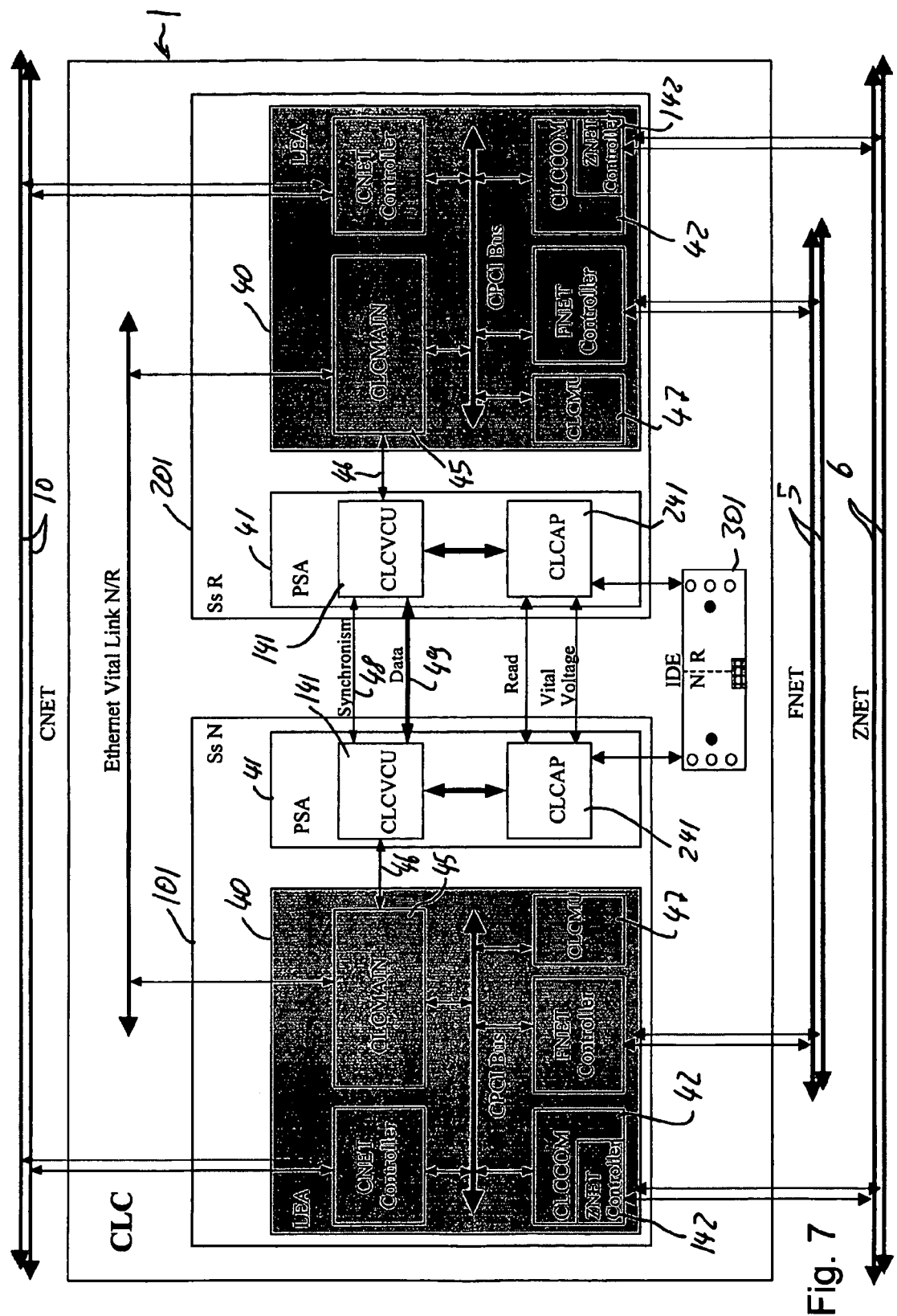
FIG. 7 shows a block diagram of the central logic computer (CLC) architecture, which includes two parallel computing channels, a Central Logic Computer N (CLC N) and a Central Logic Computer B (CLC B), each having a checker and protection unit, designed to control the redundancy of the two computing channels in an Inherently Fail Safe manner.
Figure 9:
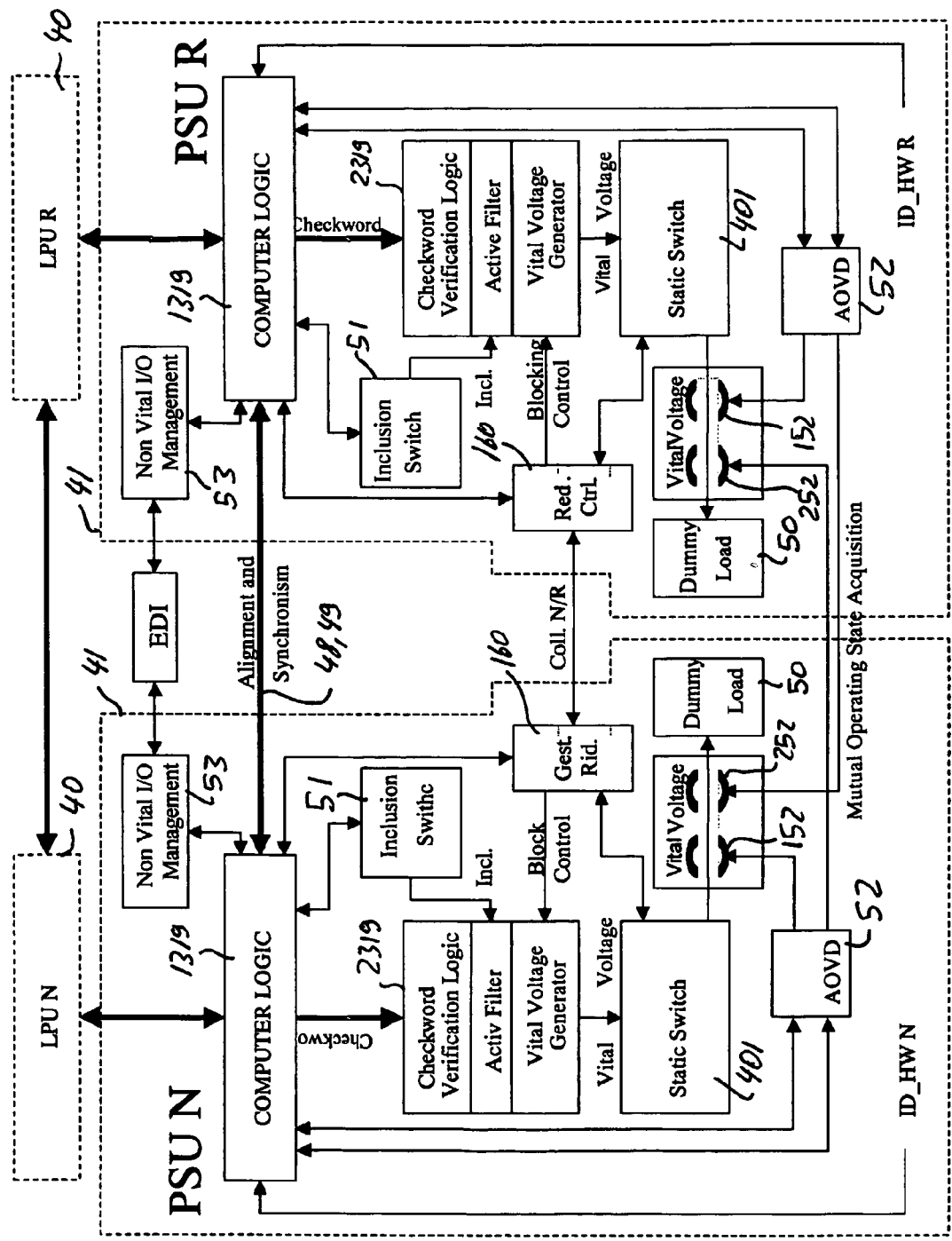
FIG. 9 shows a more detailed diagram of FIG. 8.

FIGS. 7 to 9 describe in greater detail the architecture that allows the above functions.

The Central Logic Computer CLC 1 is a redundant subsystem composed of the two logic processing units 101, 201, named CLC N and CLC B, which are identical as regards both hardware and software. These units may be only differentiated by means of an appropriate HW identifier, which is reread by software procedures.

As described above, the two processing units 101, 201 can accomplish the various functions even when the twin unit is absent (stand-alone operation).

Each processing unit 101, 201 is in turn composed of two assemblies, named: Logic Processing Unit (LPU), designated by numeral 40 and Protection and Synchronization Unit (PSU), designated by numeral 41, which are appropriately interconnected, and each designed for a particular task.

The LPU assembly 41 accomplishes communication and equation solving functions and consists of commercial cards based on CPCI buses (Compact Peripheral Component Interface), which are equipped with Intel Pentium microprocessors. This arrangement allows to use the computing power, flexibility and configurability of the subsystem, while reducing development and manufacturing costs. This assembly is also adaptable to any future developments and enhancements, in view of the high availability development expectations of CPCI bus-based devices.

The PSU assembly is a checker and protection unit 41 which accomplishes checking and protection functions and is composed of dedicated cards based on INTEL 80385 and 8085 microprocessors. This arrangement is urged by the need of implementing certain hardware solutions with vital modes that might not be ensured by commercial hardware. A basic task of the PSU assembly 41 is to synchronize its respective processing unit 101, 201 and to check the proper operation thereof, including its alignment with the other processing unit.

The LPU unit 40 acquires from its checker and protection unit PSU the enable signals required for proper operation and transmits thereto the result of its functions.

The LPU assembly or computer unit 40 is the processing unit section that computes the railway system logic, whereas the results of this computation are certified by checkwords that are in turn transferred to the checker and protection unit PSU 41 for validation.

The architecture of the checker and validation unit substantially corresponds to that of the same unit as described with reference to the embodiment of FIGS. 2 to 6, and is composed of a protection section and of an application-specific hardware and software section, the application being in this case the redundancy control of the two computer channels provided by the two computer units LPU.

Both processing units CLC N 101 and CLC B 202 have interfaces for connection of the subsystem with the redundant network CNET 10, and with multiple redundant networks ZNET 5 and FNET 6. Through these networks, the two processing units 101, 201 acquire in parallel remote vital and non vital inputs from the different nodes and from the different remote units, whereas only the "operating" processing unit is transmission enabled.

FIG. 7 shows the individual subunits or cards that compose each of the processing units 101, 201. The FNET controller card 140 is actually a PMC Carrier card, which may house up to two PMC piggyback modules, to be used either for connection with two redundant ZNET networks, or with two redundant FNET networks, as they use the same type of transmission support and the same communication mode.

The Central Logic Computer CLC 1 contains other interfaces for connection between the processing units N 101 and B 201, which interfaces allow the exchange of resulting data, the alignment procedure and the synchronism between the two parts.

Further, the Central Logic Computer CLC 1 has a local BDI operator interface 310 which must be appropriately connected for the control of devices, non vital inputs and outputs which compose it.

The system has a device that can differentiate, during setup, the Central Logic Computer CLC 1 into the two processing units CLC N 101 and CLC B 201. This function is provided by an external hardware identifier (jumper), accessible without removing the cards, which allows to nominally identify the two apparatuses. This identifier is the only differentiating element of the two processing units 101, 201, which would otherwise be identical, in terms of both HW and SW. Each processing unit shall include Inherent Fail Safe HW, for vital acquisition of this input, so that the processing software may associate the name to the processing unit 101, 201 in which it is loaded.

As mentioned above, the LPU unit 40 has the main functions of communicating with the external subsystems, of processing the system logic and of exchanging the computed variables with the redundant subsystem. All these functions, that are deemed to be vital, are certified by a checkword transferred to the checker and protection unit PSU 41.

The LPU unit 40 has the following interfaces:

an external two-port 10/100 Mbit/s Ethernet interface, which is used to connect the system's CNET backbone 10, logically controlled by the CLCCOM (Central Logic Computer Communication) card 42 and fitted on the "CNET Controller" card 43;

multiple external redundant RS485 interfaces, for connection to the ZNET and FNET networks 5 and 6, which are logically controlled by the CLCCOM card 42 and fitted on multiple PMC carrier cards (including the CLCCOM);

an internal 10/100 Mbit/s Ethernet interface 44, which is used for exchanging data with the LPU B (or N) unit 40, controlled by the CLCMAIN (Central Logic Computer Main) card 45;

an internal serial RS232 interface 46 for connection to the checker and protection unit PSU 41, controlled by the CLCMAIN card 45.

The basic configuration includes the following cards, all equipped with a CPCI Bus interface:

The CLCCOM card 42 is designed for low-level protocol communication functions for the various redundant networks (CNET, FNET, ZNET) and must further support a PMC piggyback module;

the PMC carrier is used to add up to two PMC piggyback modules, i.e. small commercial cards that can handle two redundant networks each, by means of a RS485 interface;

The CLCMAIN card 25 is designed for coding and decoding remote variables (i.e. the transport level of the protocol in use), for computing the system's logic and for exchanging data;

The CNET Controller card 43 is a two-port 10/100 Mbit Ethernet controller. The CNET controller card 43 is used for connection with the CNET network 10 and is controlled, through the CPCI, by the CLCCOM card 42.

The CLCMU card 47 is used as a support for the mass storage of the LPU unit 40.

All the components of the LPU unit 40 are available on the market. This allows to scale the computing power as a function of the actual system needs and to use an upgradeable architecture in view of future CPCI-related innovations.

The CLCCOM card 42 is a 6U single Eurocard card equipped with an INTEL Pentium microprocessor or higher. It is specially designed for the NON vital function of completing the low level communication protocol with external communication backbones. The exchange of data with the nodes or the remote units connected to the CNET network 10 may be based on the UDP/IP protocol, whereas the exchange of data with the nodes or the remote units connected to the ZNET and FNET networks 5 and 6 is based on the HDLC protocol, in Master-Slave mode, with the CLCCOM acting as a Master. Transmission across networks shall be solely controlled by the CLCCOM of one of the two processing units 101, 201, N or B, i.e. the "operating" one, while both cards simultaneously receive data from the outside.

The card inserted in a frame with a CPCI bus also performs monitoring and arbitration functions on the bus ("system" card) and manages the initial setup phase.

The CLCCOM card 42 also accomplishes the PMC Carrier card function, with the task of physically supporting a PMC piggyback expansion module which can control two redundant networks, of the ZNET or FNET type 5, or 6, through a RS485 connection. If the system is set up as having multiple ZNET and FNET networks, the CLC is connected thereto through additional PMC modules fitted on special PMC Carrier cards. Both these cards and the CNET Controller card 43 are logically controlled by CLCCOM, which is thereby responsible for all monitoring functions on the low level communications with the external subsystems.

From a functional point of view, the CLCCOM card 42 is specially dedicated to non vital functions. The vital data protection function, both in the transmit and receive directions, is allocated to the CLCMAIN card 45.

The operating system VxWorks 5.X by Wind River is installed on the CLCCOM card: the use of a commercial operating system has no direct impact upon safety, as no vital functions are allocated to the card. The CLCCOM only interfaces with the other cards of the LPU unit through the CPCI bus.

The CLCMAIN card 45 is a 6U single Eurocard card equipped with an INTEL Pentium CPU or higher. Typically, it has the following main functions:

Application level management of the proprietary communication protocols being used to transmit data on CNET, FNET and ZNET networks;

System logic processing;

Data exchange between the LPU units N and B, i.e. those belonging to the processing units N and B;

Data exchange with the corresponding checker and protection unit PSU 41, i.e. transmission of certifications confirming the correct operation of the individual vital functions and reception of all information about logic alignment and time marking;

Diagnostic functions.

The CLCMU card 47 is designed for storing subsystem setup data and the application code used by the different microprocessors. Mass storage is accessed, in read-only mode, when the subsystem is turned on or during a reset.

The CLCMU card 47 is 6U single Eurocard card which houses two PCMCIA memory card flash disks, which separately contain the system setup data and the application software, thereby ensuring independence between code data and application data. Alternatively, the function accomplished by the CLCMU card 47 may be accomplished by the CLCCOM card 42, through a PMC piggyback module, otherwise used for serial line communications.

The software and/or configuration data is updated by reprogramming the Flash Memories. This may be done at the factory or at the site, by using a portable development tool.

The checker and protection unit PSU 41 is designed for checking and protecting the vital activities and for controlling the redundancy of the two processing units 101, 201. The checker and protection unit PSU 41 also has the function of controlling local inputs and outputs, including those of the BDI panel 401, of acquiring the HW identifier and of detecting the Vital Voltage supplied by its own LPU unit 40 and by the twin LPU.

The protection function provided on the checker and protection unit PSU 41 uses the certifications (checkwords) produced by all the algorithms of the processing units 101, 201, both those produced by the checker and protection unit PSU 41 itself and those produced by its own computer unit LPU 40. When the expected checkword flow is absent or altered, the protection function prevents any Vital Voltage generation.

Another important function of the checker and protection unit PSU 41 is redundancy control, which involves a check of the alignment between the two hot backup processing units 101, 201. This arrangement prevents the possibility that a backup processing unit 101, 201 turning to the "operating" state is misaligned, and hence causes a logic discontinuity in the system.

The checker and protection unit PSU 41 also has the function of generating a pseudorandom value, named VSN, which is used as a time stamp. This value uniquely identifies the current processing cycle and is used to mark the vital data on the LEA computing assembly 40, as the presence of commercial HW which uses a cache memory does not allow to ensure a continuous refresh of variables at every cycle.

The checker and protection unit PSU 41 has the following internal interfaces:

the RS232 serial interface 46 for connection with the computer unit LPU 40 of the corresponding processing unit, which interface is controlled by the CLCVCU control section (Central Logic Computer Vital Control Unit) 141;

the RS485 serial interface, which is used to control the alignment and the logic synchronization with the remote checker and protection unit PSU, this interface being controlled by the CLCVCU 141;

a channel 49, which is used to transmit and receive hardware synchronism with the other processing unit, controlled by the CLCVCU 141.

The checker and protection unit PSU 41 is physically composed of the following cards:

A Central Logic Computer Vital Control Unit (CLCVCU) 141, which is designed for checking and protection functions, with the function of concentrating all the checkwords provided by the processing unit 101, 201 whereto it belongs, to check the sequence thereof, to control redundancy and to provide the computer unit LPU 40 with the correct VSN time stamp and the vital contribution, to be later used when transmitting remote vital variables to certify proper operation thereof;

A Central Logic Computer Application (CLCAP) card 241, through which certain subsystem-specific hardware solutions are provided. Particularly, this module acts as an interface with the BDI panel 401, and as an interface for reading the HW identifier and for detecting Vital Voltage. Further, this card contains some of the circuits designed for non vital redundancy control.

As is apparent from FIG. 8, the CLCVCU card has the same or substantially the same construction and functions as the VMMIVCU described in the previous embodiment of FIGS. 1 to 6. The checkword structure and management, including validation arrangements, are described in detail, for instance in U.S. Pat. No. 4,553,200, mentioned above with reference to the previous embodiment. The CLCVCU card 141 is a 6U single Eurocard card with a dedicated construction, i.e. not based on commercial hardware, which accomplishes checking and protection functions. The checker section has the function of:

managing local non vital inputs and outputs;

controlling the acquisition of the HW identifier and of the Vital Voltage by using Inherent Fail Safe HW circuits printed on the CLCAP card 241;

managing checkwords and passing them to the protection section, with a well defined synchronism;

updating the VSN time mark value at every cycle:

transmitting the inclusion signal to the protection section;

controlling redundancy and all the alignment and state detection logic, by also using the circuits printed on the card CLCAP 241;

controlling the non vital switching logic, by means of a static switch which, with the one of the backup processing unit 101, 201, only enables Vital Voltage transmission to one of the two parallel processing units 101, 201;

generating the vital enabling signal to be transmitted with the remote vital variables;

controlling communications with the computer unit LPU 40, and more precisely with the CLCMAIN card 45;

controlling the information exchange with the CLCVCU 141 of the other processing unit 101, 201, including the HW synchronism signal.

The protection signal is also obtained by using the above VPC2 circuit, wherewith a Vital Voltage may be only generated if the checker section cyclically provides the correct checkwords, by using a shared memory, and the inclusion signal, through a switch positioned on the CLCAP card 241 and controlled by the CLCVCU 141. Therefore, typically the protection section, at every recheck-cycle, i.e. every 50 ms:

acquires the various checkwords provided by the checker section;

processes checkwords and provides a Vital Voltage based on the value thereof and on the Inclusion signal.

In FIG. 8, the HW CLCVCU card was divided into several different functional blocks, grouped in checker and protection sections, which blocks will be considered individually below.

The CLCVCU checking logic 141 is physically obtained by means of an Intel 80386 processor.

The CLCVCU checking logic accomplishes the following functions:

Synchronizing the processes of the computer unit LPU 40, and the checker and protection unit PSU 41. At every processing cycle, the checking logic produces a new VSN (Vital Sequence Number) time mark defining the time progress of the subsystem. The VSN value progresses, cycle after cycle, through a predetermined succession of states, by using a Polynomial Divider (PD). The VSN time-mark value provides protection against the presence of obsolete data in the processors which use a cache memory, such as the Pentium used in the CLCMAIN 45 of computer unit LPU 40. (It shall be noted that the 80386 processor has no cache memory).

Hardware synchronization of the two 80386 microprocessors on the CLCVCU checker and protection cards of the two processing units 101, 201, by using a dedicated connection.

Communication with the computer unit LPU 40. Communication with the computer unit LPU 40 occurs on the proprietary asynchronous RS232 communication line allows transmission of the following information:

from the computer unit LPU 40, to the checker and protection unit PSU 41. The checkwords produced by the vital algorithms residing on the computer unit LPU, as well as additional diagnostic information;

from the protection and checker unit PSU 41 to the computer unit LPU 40: the cyclically updated Vital Sequence Number (VSN) time mark value, the vital variables required for proper system logic computation and for remote vital variable transmission, status information and other diagnostic data.

Checkword verification and communication with the VPC2 designated by the same numeral 2319 as in the previous embodiment. The checking logic 1319 transmits the checkwords produced by the algorithms contained in the computer unit LPU 40 and in the checker and protection assembly PSU 41, through a two-port memory, to the protection section VPC2 2319. Two-port memory accesses are synchronized with the help of flags.

State detection of local non vital inputs and control of local non vital outputs, with the help of special circuits printed on the application card CLCAP 241.

State detection of vital inputs, with the help of special circuits printed on the application card CLCAP 241.

Communication with the application module through special circuits printed on the CLCAP 241. This communication occurs through an internal bus, and the exchanged information includes:

state variables for local non vital inputs and outputs;

the Inclusion variable and the vital check thereof;

the vital variables used for detecting the presence of Vital Voltage on the local branch and on the remote branch;

the vital variable associated to the HW identifier reread function, as well as other possible variables associated to the state of additional vital inputs;

switching request and redundancy-related information;

Generally, the checker logic on the 80386 certifies the operations of the whole subsystem and controls redundancy thereof.

The checker section 1319 of the CLCVCU card 141 of the checker and protection unit PSU 41 further includes:

A Flash EEPROM 25 which, as a non volatile memory, is used to contain the application code and the configuration data used by the processing logic of the CLCVCU checker and protection card 141.

A Polynominal Divider PD. This device accomplishes the polynomial division function by using hardware. This function is widely used, e.g. for VSN time mark generation, i.e. for the VSN Generator (VSNG) function, or for checkword generation. By implementing the polynomial division algorithm in hardware form, an acceleration of all vital algorithms residing on the CLCVCU card 141 is provided.

A two-port memory. The two-port memory acts as a physical interface between the checker logic 1319 and the protection logic 2139. The information exchanged across this area, as well as certain configuration parameters and synchronization flags, are the checkwords produced by the algorithms that reside on the different logics of the checker section 1319.

A RS232 communication interface 46. This interface allows communications with the computer unit LPU 40, and more precisely with the CLCMAIN card 45 thereof. A proprietary protocol is used and transmission is controlled by the CLCVCU card 141 itself.

A RS485 communication interface 48, 49. This interface allows communication between the two CLCVCU cards 141 of the two processing units 101, 201 and is used for the exchange of information relating to the logic alignment process between these two processing units 101, 201.

An I/O port toward the CLCAP application card 241. This interface controls data reception and transmission from and to the CLCAP card 241, through a suitable internal bus.

The protection section (VPC2) 2319. The protection section only provides an output Vital Voltage when the expected checkword flow is detected at its input. It consists of a 8085 microprocessor and an Inherently Fail Safe vital filter. As a result of the validation by the logic residing on the microprocessor 8085, two signals are generated toward the vital filter, which have precise waveform characteristics (square waves with different frequencies and duty cycles), and are used to generate a voltage detectable through the CLCAP application card 241. The power output from the vital filter is of 1.5 W at 12.5 V. Every 50 ms, the waveforms are cyclically regenerated based on the checkwords received by the checker section, by exchanging data with the "Two port memory". Furthermore, the Active Filter part, placed on the protection unit VPC2 2319 to generate the Vital Voltage, also needs an enabling signal, defined as Inclusion 51, whereby the hot backup function may be controlled. Due to the fact that only one of the two processing units can transmit Vital Voltage, this unit, before being checked, is controlled by a static switch 401 which allows to connect one of the two processing units 101, 201, N or B, to a dummy load 50.

The static switch 401 is controlled by a circuit that is distributed on both CLCAP application cards 241 and by an internal logic or by transmitting controls from the checker section 1319.

The CLCAP application board 241 accomplishes CLC-specific functions by using proprietary, i.e. non-commercial hardware solutions, without using microprocessors and in many cases it is even found to be the circuit interface of some functions provided on the checker and protection card CLCVCU 141. Particularly, the module comprises:

the Inclusion switch 51, wherefrom the Vital Filter of the protection section VPC2 2319 receives the Inclusion signal;

the AOVD circuits 52 used for safe Vital Voltage acquisition;

the circuits 54 for safe HW identifier acquisition (as well as other vital inputs);

the circuits 53 for non vital input and output control.

FIGS. 9 and 10 show the logic and circuit breakdown of the checker and protection cards CLCVCU 141 and the application cards CLCAP 241, wherein the darker blocks belong to the application card CLCAP 241. The "dummy load" 50 as shown in the Figures, exemplifies the terminal part of the two Vital Voltage branches, which need some dummy load, while maintaining electrical insulation. "Redundancy control", generally indicated as 60 in FIG. 9, was interposed between the two processing units 101, 201, as the circuit is distributed between the two CLCAP(N) and CLCAP(B) cards, as is apparent from FIG. 10.

The inclusion switch 51 is a static switch which receives an Inclusion control at its input from the Computer logic 1319 of the checker section placed on the 80386 and, on the basis of this control, transmits the Inclusion signal that allows proper operation of the Active Filter. Then, the transmitted Inclusion value is rechecked to allow the Computer logic 1319 to check its correctness. The signal provided by this switch is rechecked by Inherent Fail Safe HW, which ensures safe acquisition of the non energized output state.

The AOVD card 52 includes devices which allow safe detection of the power off condition downsteam from the switch 401. The checker and protection unit PSU 41 of each processing unit 101, 201 has an AOVD device, designed for detecting Vital Voltage at the output of its branch and at the output of the branch of the twin processing unit 152, 252. Power off state detection allows to certify the possible failure of a processing unit 101, 201 and the proper operation of redundancy control.

The redundancy control unit, which is generally shown in FIG. 9, wherein it is designated by numeral 60, is composed of a circuitry which is physically distributed on two application modules, as indicated with 160 in FIG. 10 and is designed for the control of switching operations between the two CLC N/B processing units 101, 201.

Switching may occur as a result of a "failure" or of a "request". In the first case, "Redundancy control" detects the lack of Vital Voltage downstream from power generators and automatically forces the static switch 401 of the processing unit 101, 201 that was not supplying voltage to the application card CLCAP 241 to the closed state. In the second case, the logic that resides on the 80396 of the checker section 1319 controls the Static Switch 401 of one of the two processing units 101, 201 to the closed state, upon a manual request (transmitted through a BDI panel 301) or based on an internal logic.

The redundancy control function can have a stand-alone operation whenever a voltage is detected either at the output of the branch of the N processing unit 101 or at the output of the branch of the B processing unit 201, by directly transmitting a block control on the Vital Power Generator of the protection section 2319.

The application module integrates devices 54 which are used for safe acquisition of the HW identifier of each processing unit 101, 201, and are denoted in FIGS. 9 and 10 as ID_HW N and ID_HW B and with numeral 54. These devices can vitally detect the identifier of each processing unit 101, 201, by rereading appropriately external jumper-configured ports that allow to differentiate the two CLC N and B processing units 101, 201. Jumpers are connected to the motherboard of the frame whereto the CLCVCU and CLCAP cards 141 and 241 are connected.

The application module CLCAP 241 integrates non vital input and output ports which are used for acquiring the buttons of the BDI panel 301 and for controlling the lamps and ringers disposed on the same panel, for the purpose of the CLC application.

Figure 11:
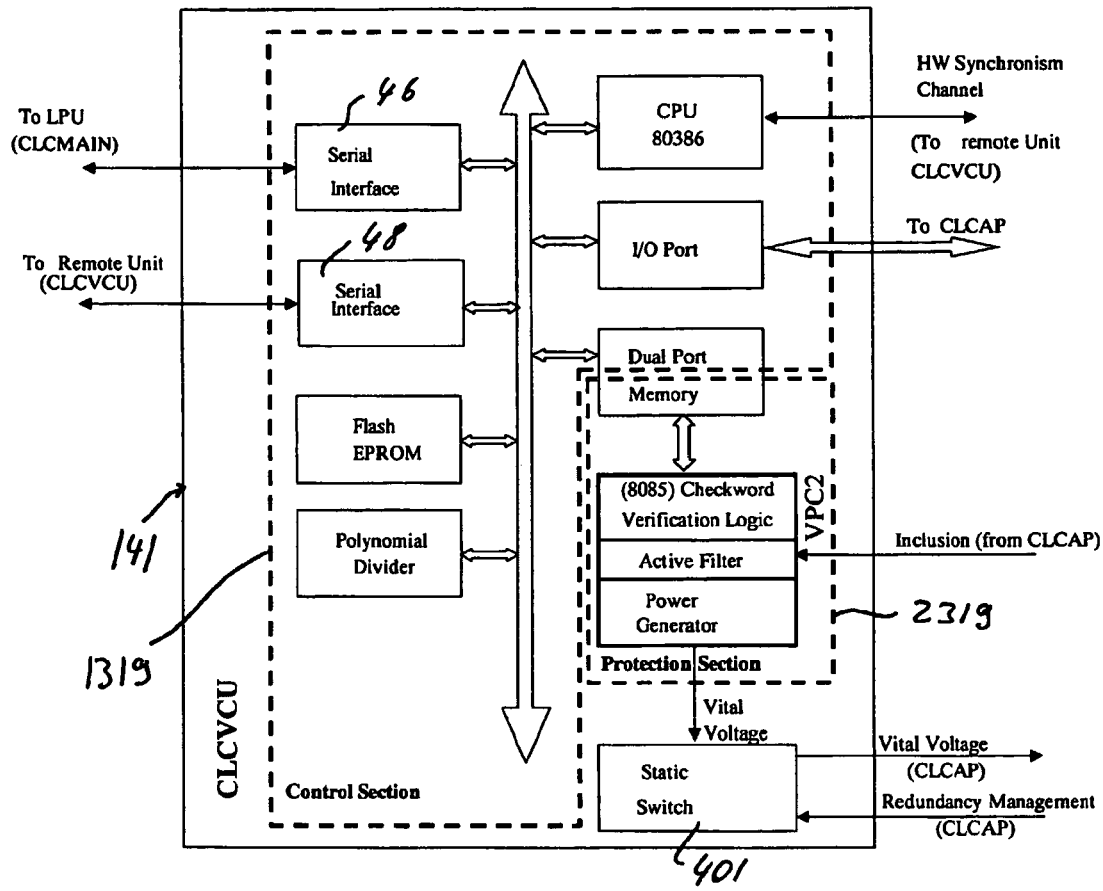
FIG. 11 shows a detailed block diagram of the checker and protection card of the checker and protection unit of one of the two processing units of the Central Logic Computer.
Figure 12:
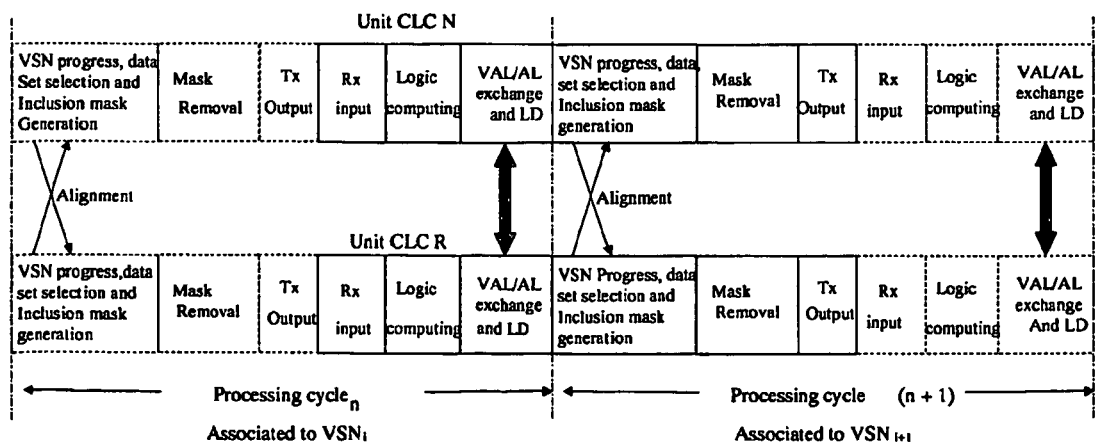
FIG. 12 shows a time chart of the critical passages of the two-channel, hot backup Central Logic Computer processing cycle.

FIGS. 11 and 12 represent the operation of the CLC Central Logic Computer 1 in graphic form. The Central Logic Computer CLC 1 has a cyclic operation whose period equals a main-cycle, which lasts 500 ms. In every main-cycle, the Central Logic Computer must accomplish all of its functions, and especially receive data from remote nodes, i.e. remote units, determine the new output state, check and certify its own operation and transmit the new output state to the different remote nodes, i.e. remote units. A different VSN time value, or time stamp is associated to each main-cycle, by using a pseudorandom sequence generator algorithm. The VSN time-stamp value is associated to the vital variables used in the computer units LPU 40 of the two processing units 101, 201, to ensure data freshness even when commercial HW is used.

In the above system architecture, the Central Logic Computer CLC 1 has a hot backup configuration, to achieve a high mission availability of the subsystem. Hot backup (for CLCN/CLCB processing units 101, 201) requires the following:

The CLCN and CLCB processing units 101, 201 have a Fail-Safe stand-alone operation;

The CLCN and CLCB processing units 101, 201 are continuously aligned to ensure operation continuity when switching therebetween;

the failure conditions that cause the loss of both CLCN and CLCB processing units 101, 201 are sufficiently rare.

Redundancy control on the CLCN/CLCB processing units 101, 201 implies that these processing units 101, 201 operate in parallel through input acquisition and system logic computation phases. However, output transmission is assigned, for each cycle, to only one of the processing units 101 or 201, i.e. the one that detects a Vital Voltage on its own branch and detects none on the branch of the other twin processing unit 101, 201. This condition corresponds to the definition of "operating" status of the processing unit 101, 201. The other processing unit 101, 201 is only functional and "available" if properly aligned with the "operating" one.

FIG. 10 shows the processing cycle of the Central Logic Computer CLC 1 in graphic form.

The main functions to be completed at every main-cycle, as reported in FIG. 10, are described below:

Input Reception

The receive phase involves a decoding operation on the data received from external subsystems and local input acquisition. This step is carried out in parallel and stand-alone mode by the two CLC N and CLC B processing units 101, 201, and all relevant Boolean equation variables are marked with the time-stamp of the running cycle (VSNi). Each processing unit 101, 201 checks the vital variables received from each remote node, i.e. from each remote unit; when a wrong or failed reception is detected, these variables are to be normalized, i.e. set to a restrictive state for the system. The reception of vital variables shall be certified and the generated checkword shall be used as a confirmation of proper operation of the processing unit. Input data is acquired by computer units LPU 40, whereto the checker and protection unit PSU 41 transmits the time-stamp generated thereby at the start of the main processing cycle of the Central Logic Computer CLC1. However, the computer unit LPU 40 computes input variables and system configuration-related memory data, and generates checkwords to be transmitted to the checker and protection unit PSU 41, i.e. to the checker card 141 for validation, through the protection section 2319, which resides on the CLCVCU card 141 itself. A wrong flow of checkwords received and validated by the protection section 2319 triggers a safety procedure, as mentioned above.

Logic Computation

Logic computation consists in the Fail-Safe processing of Boolean equations which describe the specific system's logic. The inputs used by the logic are the inputs acquired by the "Input reception" function and the internal state variables derived from the previous processing cycle, i.e. those marked with the time-stamp of the previous cycle. Some temporary variables, named current variables (CR) are used for equation solving. All equation input variables are marked with the VSNi and logic is computed regardless of the state of the two processing units 101, 201. The logic is computed by the computer units LPU 40 of the two processing units, under the supervision of the checker and protection unit PSU 41 as regards time marking and cyclically generated checkwords during the cycle. Typically, a checkword generation and verification cycle is a submultiple of the main-cycle duration, i.e. of the order of about 50 ms.

The vital output and state variables (also named VAR/AL) derived from the computation function executed in the computer units LPU 30 are appropriately marked not with the current VSNi value, but with a time mark, i.e. the future time-stamp, i.e. VSN i+1, and with a value that is associated to the name of the generating processing unit (CLCN or CLCB) 101, 201.

The computation function generates a checkword which contributes to certify proper operation of the computer units LPU 40, and is provided thereby to the checker and protection unit PSU 41.

VAL/AL exchange (vital output and state variables) and DL (Degradation Level).

VAL/AL variables are mutually exchanged between the two computer units LPU 40 before any use thereof. Exchange variables are marked as a function of the name of the generating processing unit 101, 201 and of the time contribution VSNi+1.

In addition to alignment variables, the two CLCN and CLCB processing units 101, 201 exchange information about their operating state and more exactly their Degradation Level value (DL).

VSN progress, data set selection and Inclusion Mask generation.

At the start of each main-cycle, the checker and protection unit PSU 41 transmits the new time stamp value (VSNi+1) to the computer unit LPU 40, and this value is used to mark the new variables received from remote units.

At every main-cycle, each processing unit 101, 201 has two data sets: one of them is determined by the computation function of its own computer unit LPU 40, and the other is determined by the computer unit LPU 40 of the other twin processing unit 101, 201. Based on the evaluation of its own state ("operating", "available" and "off"), each of the two processing units 101, 202 shall select one of the two data sets, from which it extracts the vital remote output variables to be transmitted and the internal state variables to be used for the next computation. This selection shall meet the following criteria:

if the processing unit 101, 201 is in the "available" state, then it selects the data generated by the other processing unit 101, 201;

in all other cases, the processing unit 101, 201 selects locally generated data.

Based on this selection, a Data Mask is generated which will allow the processing unit 101, 201 to "release" the appropriate variable set. Also, proper operation is the only condition for the "operating" processing unit 101, 201 to generate an Inclusion Mask, i.e. a vital transmission enabling signal, whereas the "available" processing unit 101, 201 is also bound to proper alignment condition. Anyway, only the "operating" processing unit 101, 201 is assigned the task of transmitting vital variables to remote nodes, i.e. to remote units.

Mask Removal

Once that the variable set to be used has been selected, and before transmitting remote vital variables, through the CNET, ZNET and FNET networks, these variables shall be cleaned of the Data Mask and only contain the current time-stamp (VSNi+1). This operation is performed by the Mask removal function.

Output Transmission

The Output Transmission step includes both the application level and lower levels. For vital application-level outputs, a safety protocol is used, and the current time contribution (VSN) as well as the Inclusion Mask are associated to these outputs. If the variables to be transmitted are of the non vital type, a non Fail-Safe transmission protocol may be used. In a few cases, these variables may be themselves controlled by a Fail-Safe transmission protocol. Diagnostic information is transmitted by using a dedicated protocol, defined as DIAGL.

States and Transitions

The control of redundancy between the CLC N and the CLC B processing units 101 and 201 requires a definition of the possible operation states of the individual processing units 101, 201. As stated above, the following states were defined:

"Off"
"Idle"
"Operating"
"Available"

The CLC Central Computer Logic requirements provide that only one processing unit 101, 201 is in the "operating" state, and that the other can remain "available" if cyclically aligned with the "operating" processing unit 101, 201. State determination for each processing unit 101, 201 is physically associated to the presence or absence of Vital Voltage at the output of the Static Switches 401 on both checker and protection cards CLCVCU 141 of the checker and protection unit PSU 41. Thanks to special circuits, named AOVD (Absence Of Voltage Detection) 52, and to a procedure named Local AOVD Test (LAT) and Remote AOVD Test (RAT), which may safely determine the Absence of Voltage on the local branch and on the remote branch, the state of each of the two twin processing units 101, 201 may be detected. If a "0" value is associated to the absence of voltage and a "1" value is associated to the presence of voltage, the admitted states are:

| LAT/RAT | Description |
| --- | --- |
| 0-0 | The two Subsystems are idle |
| 1-0 | The local subsystem is in the "operating" state, whereas the remote subsystem is "idle" or "available" |
| 0-1 | The remote subsystem is in the "operating" state, whereas the local subsystem is "idle" or "available" |
| (1-1) | A case that generates a resetting checkword, only admitted for a few milliseconds |

As mentioned above, only one processing unit 101, 201 may be in the "operating" state, whereby the LAT/RAT test=1-1 is not admitted. This state may only occur for a few milliseconds in the switching phase; if it remains and is detected by the LAT/RAT test, it will cause a wrong checkword generation and the reset of the Central Logic Computer.

The "available" processing unit 101, 201 may turn to the "operating" state by means of a switching operation, which may be performed as a result of a "failure" or of a "request". The switching mode shall be such as to ensure the continuity of vital output states.

If switching results from failure, the "available" processing unit 101, 201, when properly aligned, is automatically turned to the "operating" state, provided that the other processing unit 101, 202, as a result of its failure, leaves the "operating" state to turn to the "idle" state.

When switching results from a request, a manual control is provided, i.e. a button on the BDI panel, whereby a processing unit 101, 201 may be turned from the "available" state to the "operating" state, while the other processing unit is automatically turned from the "operating" state to the "available" state. During the power on process, the same button may be used to select the processing unit which is to be turned to the "operating" state. This switching operation may be also requested by the logic for diagnostic reasons, or to have the processing unit 101, 201 operate more efficiently. In fact, a Degradation Level (DL) is associated to each CLCN and CLCB processing unit 101, 201, whereby switching upon request is urged when the "operating" processing unit 101, 201 detects a Degradation Level (DL) which is higher than that of the "available" unit. (The higher the DL, the higher is the unavailability level of the processing unit 101, 201.)

FIG. 11 shows the various transitions between states.

The inventive principle is clearly shown in the description of the different embodiments.

Microprocessor-based devices with non Inherently Fail-Safe architectures are provided with the Inherently Fail-Safe feature by associating them with additional Inherently Fail-Safe processing devices, which are designed to check the process of the first processing device in all relevant, i.e. vital phases. The first processing devices are programmed and constructed to perform logic processing for control and/or monitoring functions, and to accomplish other functions, such as image generation from input data or input control generation or, as in the case of the last embodiment, to compute algorithms that generate output data or controls based in the input data or controls on the basis of predetermined and preprogrammed logics. The first processing units are further programmed to carry out checkword generation steps, for cyclic checkword transmission to the associated checker and protection units. Then, the latter only accomplish the function of checking the operation flow of the first processing and checkword validating units, and generate vital check data which is transmitted thereby to the first processing units to allow the execution of the processing cycles and/or carry out safety operations which block or switch the processing unit outputs to conditions or data sets into predetermined safety outputs.

The checker and protection units are composed of two microprocessor sections, one being exclusively designed for the functional control of the processing units, and the other being exclusively designed for checking and validating the received checkwords. In principle, this architecture is already known from the document that is mentioned several times herein. The checker and protection units also include application-specific sections, which are designed for processing unit target applications, and ensure that specific safety functions are accomplished for those applications, when faults are detected in the checkword flow, such as monitor power off, or when data transmission enabling signals are switched from one to the other of the two-channel Central Logic Computer Logic processing units. This checker and processing unit architecture allows to obtain substantially the same checker and protection section for any application type, with substantially the same checking and processing program, whereas the checker and processing unit is adapted to the specific use, thanks to the application section, which is expressly designed to meet the specifications of the hardware that depends on the processing units or is served thereby.

Obviously, the invention is not limited to the above description and figures, but may be greatly varied, especially as regards construction, without departure from the inventive teaching disclosed above and claimed below.

The invention claimed is:

1. An Inherently Fail Safe processing or control apparatus comprising a first processing unit with
   a first processor and a memory containing a predetermined data processing and/or control program;
   at least one input port for input data received from at least one remote unit;
   at least one output port for output data to be transmitted to at least one remote unit under the control of said first processing unit;
   wherein
   the first processing unit further comprises a generator for generating unique codes checkwords for functional checks of the processing and/or receiving and/or transmitting steps being performed and a port for the transmission of the checkwords generated at each step;
   a functional checker and protection unit is further provided, which further comprises a fail-safe second processing unit, with a memory containing a program for checking the functional steps of the first processing unit and a program for checking the correctness of functional control codes checkwords and the time sequence thereof;
   which functional checker and protection unit communicates, by a transmit and/or receive port, with the first processing unit, and generates enabling signals for the first processing unit when the checkwords are correct;
   while the functional checker and protection unit generates signals for disabling the activity of the first processing unit and/or for forcing the first processing unit to the transmission of predetermined output data for fail-safe remote unit control, or the said functional checker and protection unit generates itself predetermined output data for fail-safe remote unit control and/or signals for enabling/disabling vital functions of the remote unit and/or of the first processing unit which are transmitted to the remote unit and/or to the first processing unit,
   wherein the functional checker and protection unit has two separate units with two separate processors and is composed of a checker subunit, which performs functional check functions on the first processing unit, by running a checking program, and a protection subunit which only performs verification functions on checkwords and on the sequence thereof, and which controls the units for enabling/disabling the vital functions of the remote unit.

2. An apparatus as claimed in claim 1, wherein the checker subunit is also programmed in such a manner as to generate itself a flow of checkwords which describe its functional state and are uniquely related to the executed checking steps, which checkwords are transmitted to the protection subunit for a correctness and sequence check.

3. An Inherently Fail Safe processing or control apparatus comprising a first processing unit with
   a first processor and a memory containing a predetermined data processing and/or control program;
   at least one input port for input data received from at least one remote unit;
   at least one output port for output data to be transmitted to at least one remote unit under the control of said first processing unit;
   wherein
   the first processing unit further comprises a generator for generating unique codes checkwords for functional checks of the processing and/or receiving and/or transmitting steps being performed and a port for the transmission of the checkwords generated at each step;
   a functional checker and protection unit is further provided, which further comprises of a fail-safe second processing unit, with a memory containing a program for checking the functional steps of the first processing unit and a program for checking the correctness of functional control codes checkwords and the time sequence thereof;
   which functional checker and protection unit communicates, by a transmit and/or receive port, with the first processing unit, and generates enabling signals for the first processing unit when the checkwords are correct;
   while the functional checker and protection unit generates signals for disabling the activity of the first processing unit and/or for forcing the first processing unit to the transmission of undetermined output data for fail-safe remote unit control, or the said functional checker and protection unit generates itself predetermined output data for fail-safe remote unit control and/or signals for enabling/disabling vital functions of the remote unit and/or of the first processing unit which are transmitted to the remote unit and/or to the first processing unit,
wherein the first processing unit has a memory for the input data to be processed, typically the cache of the processor, which data is marked with the time-stamp of the current processing cycle, while all input data marked with the time-stamps of past processing cycles are cleared from the memory.

4. An apparatus as claimed in claim 3, wherein the checker subunit is programmed to generate vital enabling data for the first processing unit and to transmit it thereto to allow proper accomplishment of its functions.

5. An apparatus as claimed in claim 3, wherein the first processing unit runs successive processing cycles having a predetermined duration, and that the checker subunit is programmed in such a manner as to generate a unique time stamp for each execution cycle of the processing program of the first processing unit, which time-stamp is updated at each start of the processing cycle of the first processing unit, a communication line being provided between the checker subunit and the first processing unit through which the processing unit transmits the time-stamp at the start of each processing cycle.

6. An apparatus as claimed in claim 5, wherein the checker and protection unit starts the processing cycle of the first processing unit by transmitting the current time stamp.

7. An apparatus as claimed in claim 4, wherein all data input to the first processing unit is marked with the time-stamps of both the current and the next cycles, for repeated processing thereof by the first processing unit.

8. An apparatus as claimed in claim 3, wherein the functional checker and protection unit has vital check interfaces from the remote unit.

9. An apparatus as claimed in claim 8, wherein vital unit check interfaces are composed of units for transmitting and/or amplifying all data output from the first processing unit, said transmitting and/or amplifying units being enabled/disabled by the checker and protection unit, based on the result of the checkword correctness and sequence verification.

10. An apparatus as claimed in claim 9, wherein vital remote unit check interfaces are composed of power supplies for said remote units, which are controlled for vital voltage supply by the checker and protection unit, based on the result of the checkword correctness and sequence verification.

11. An apparatus as claimed in claim 3, wherein the first processing unit has remote unit control units, which transmit output data to the remote unit through the transmitting/amplifying interfaces of the checker and protection unit.

12. An Inherently Fail Safe processing or control apparatus comprising a first processing unit with
a first processor and a memory containing a predetermined data processing and/or control program;
at least one input port for input data received from at least one remote unit;
at least one output port for output data to be transmitted to at least one remote unit under the control of said first processing unit;
wherein
the first processing unit further comprises a generator for generating unique codes checkwords for functional checks of the processing and/or receiving and/or transmitting steps being performed and a port for the transmission of the checkwords generated at each step;
a functional checker and protection unit is further provided, which further comprises of a fail-safe second processing unit, with a memory containing a program for checking the functional steps of the first processing unit and a program for checking the correctness of functional control codes checkwords and the time sequence thereof;
which functional checker and protection unit communicates, by a transmit and/or receive port, with the first processing unit, and generates enabling signals for the first processing unit when the checkwords are correct;
while the functional checker and protection unit generates signals for disabling the activity of the first processing unit and/or for forcing the first processing unit to the transmission of predetermined output data for fail-safe remote unit control, or the said functional checker and protection unit generates itself predetermined output data for fail-safe remote unit control and/or signals for enabling/disabling vital functions of the remote unit and/or of the first processing unit which are transmitted to the remote unit and/or to the first processing unit,
wherein it has two first processing units in which programs are executed for controlling and checking at least one remote unit and/or multiple different and/or at least partly identical remote units, a dedicated checker and protection unit being associated to each of said two first processing units, and said two first processing units being identical and programmed with the same processing program, which processing program is executed simultaneously and in parallel by said two processing units, whereas means are provided to synchronize the checker and protection units and an enabling interface, which is used to enable transmission of output data of each of said two first processing unit to the remote units, which enabling interface has an Inherently Fail-Safe operation and sets the operating state for the transmission unit of only one of said two first processing units.

13. An apparatus as claimed in claim 12, wherein each checker and protection unit, associated to one of said two first processing units respectively, includes a subunit for detecting Vital Voltage at the transmission unit of each of the two first processing units and a static switch, for supplying Vital Voltage to transmission units, each of the Vital Voltage detection subunits being provided with Vital Voltage detection sensors, to detect Vital Voltage at both transmission units of said two first processing units.

14. An apparatus as claimed in claim 13, wherein each of the checker and protection subunits has a redundancy control unit, which has inputs for Vital Voltage presence data from the two Vital Voltage detection subunits, associated to one of the two checker and protection subunits respectively, and outputs for controlling the cutoff of Vital Voltage supply to one of the two transmission units as a function of the received Vital Voltage presence data.

15. An Inherently Fail Safe processing or control apparatus comprising a first processing unit with
a first processor and a memory containing a predetermined data processing and/or control program;
at least one input port for input data received from at least one remote unit;
at least one output port for output data to be transmitted to at least one remote unit under the control of said first processing unit;
wherein
the first processing unit further comprises a generator for generating unique codes checkwords for functional checks of the processing and/or receiving and/or transmitting steps being performed and a port for the transmission of the checkwords generated at each step;

a functional checker and protection unit is further provided, which further comprises of a fail-safe second processing unit, with a memory containing a program for checking the functional steps of the first processing unit and a program for checking the correctness of functional control codes checkwords and the time sequence thereof;

which functional checker and protection unit communicates, by a transmit and/or receive port, with the first processing unit, and generates enabling signals for the first processing unit when the checkwords are correct;

while the functional checker and protection unit generates signals for disabling the activity of the first processing unit and/or for forcing the first processing unit to the transmission of predetermined output data for fail-safe remote unit control, or the said functional checker and protection unit generates itself predetermined output data for fail-safe remote unit control and/or signals for enabling/disabling vital functions of the remote unit and/or of the first processing unit which are transmitted to the remote unit and/or to the first processing unit, wherein it generates images corresponding to the data received from at least one or more remote units, the first processing unit being programmed for data reception, data interpretation with reference to a remote unit system configuration map stored therein, and for image reconstruction data generation from input data, said first processing unit consisting of a microprocessor card and one or more graphic adapters, whereas the checker and protection unit has a yard for amplifying/transmitting the graphic adapter signals to video monitors, the outputs of the graphic adapters of the processing unit being connected to said amplifying/transmitting card, the latter being connected to Voltage supply through a vital switch controlled by the protection section based on the correctness of received checkwords.

16. An apparatus as claimed in claim 15, wherein the processing unit is a generator of controls from keyboard inputs, the keyboard being connected to a processing unit for turning graphic or alphanumeric controls into control data and for transmitting them to a processing unit which forms a section of the checker and protection unit, which interface is connected to the Vital Voltage supply through a vital switch controlled by the checker and protection unit.

17. An apparatus as claimed in claim 16, wherein the processing unit is a graphics processing unit claimed in claim 15, which generates echoes of keyboard input controls on the screen, the checker and protection unit being provided with an interface card for connection of the graphic adapters of processing units to monitors, and with an interface for connection of the control keyboard with the processing unit.

18. An apparatus as claimed in claim 12, wherein the two processing units are two parallel central logic computers, each forming one of the two parallel processing channels of a Central Logic Computer, particularly designed for railway station system control.

19. An apparatus as claimed in claim 18, wherein each of the two processing units is connected to a checker and protection unit, said units communicating for synchronization check, by comparing the time stamps generated thereby, and said checker and protection units being connected to Vital Voltage sensors which detect Vital Voltage at two output data transmission units, each of the latter being integrated in one of the two processing units, and said checker and protection unit enabling the transmission unit of only one of the two processing units, based on the result of Vital Voltage detection thereon, and based on the verification of checkwords from the two processing units.

20. An apparatus as claimed in claim 3, wherein it is a part of a system that comprises one or more remote units, which are at least partly different and/or at least partly identical, and communicating with the apparatus, i.e. with the processing unit thereof, said apparatus having a memory for storing the system configuration data and a memory for a processing unit management program, and having a program for checking configuration data and/or the processing program, that generates configuration data and processing program code correctness checkwords, which are sent for correctness check to the checker and protection unit, the configuration data and/or the processing program code being checked in partial and successive data and/or code sets, arranged in a predetermined number of successive program executing cycles.

21. An apparatus as claimed in claim 3, wherein multiple successive cycles are executed for functional checkword generation and checkword verification, which are repeated at frequencies corresponding to submultiples of the total processing cycle duration.

* * * * *